(12) United States Patent
Kim et al.

(10) Patent No.: US 10,406,979 B2
(45) Date of Patent: Sep. 10, 2019

(54) USER INTERFACE APPARATUS FOR VEHICLE AND VEHICLE

(71) Applicant: LG Electronics Inc., Seoul (KR)

(72) Inventors: Daebum Kim, Seoul (KR); Ilho Kim, Seoul (KR); Jinkyo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/857,106

(22) Filed: Dec. 28, 2017

(65) Prior Publication Data

US 2018/0339654 A1     Nov. 29, 2018

(30) Foreign Application Priority Data

May 29, 2017     (KR) .......................... 10-2017-0066276

(51) Int. Cl.
*B62D 15/02* (2006.01)
*B60W 30/06* (2006.01)
(Continued)

(52) U.S. Cl.
CPC .............. *B60Q 9/002* (2013.01); *B60K 35/00* (2013.01); *B62D 15/0285* (2013.01);
(Continued)

(58) Field of Classification Search
CPC ...................................................... B60Q 9/002
(Continued)

(56) References Cited

U.S. PATENT DOCUMENTS

2014/0121883 A1* 5/2014 Shen .................. B62D 15/0285
701/28
2015/0283998 A1* 10/2015 Lind ..................... B60W 30/00
701/23
(Continued)

FOREIGN PATENT DOCUMENTS

DE      102010022716      12/2011
DE      102015115259       3/2016
(Continued)

OTHER PUBLICATIONS

European Search Report in European Application No. 18164176.2, dated Sep. 25, 2018, 7 pages.

*Primary Examiner* — Santiago Garcia
(74) *Attorney, Agent, or Firm* — Fish & Richardson P.C.

(57) ABSTRACT

A user interface apparatus for a vehicle includes a display unit; an interface unit that receives information; at least one processor; and a computer-readable medium having stored thereon instructions that, when executed by the at least one processor, causes the at least one processor to perform operations that include: receiving, through the interface unit, first information regarding a planned autonomous parking operation of the vehicle, and second information regarding a progress of an autonomous parking maneuver performed by the vehicle based on the planned autonomous parking operation; displaying, through the display unit, a graphic object corresponding to the first information regarding the planned autonomous parking operation of the vehicle; and controlling the display unit to apply an animation effect to (Continued)

the graphic object being displayed, the animation effect corresponding to the second information regarding the progress of the autonomous parking maneuver performed by the vehicle.

17 Claims, 23 Drawing Sheets

(51) Int. Cl.
  *B60Q 9/00*    (2006.01)
  *G09G 5/37*    (2006.01)
  *B60K 35/00*   (2006.01)
  *G06T 13/80*   (2011.01)

(52) U.S. Cl.
  CPC ............... *G06T 13/80* (2013.01); *G09G 5/37* (2013.01); *B60K 2350/106* (2013.01); *B60K 2350/1084* (2013.01); *B60K 2350/1088* (2013.01); *B60K 2350/965* (2013.01); *B60W 30/06* (2013.01); *G09G 2380/10* (2013.01)

(58) Field of Classification Search
  USPC ......................................................... 340/438
  See application file for complete search history.

(56) References Cited

U.S. PATENT DOCUMENTS

| | | | |
|---|---|---|---|
| 2016/0055750 A1* | 2/2016 | Linder | G08G 1/16 |
| | | | 340/905 |
| 2017/0253181 A1* | 9/2017 | Choi | B60Q 9/008 |
| 2018/0154831 A1* | 6/2018 | Spencer | B60R 1/00 |
| 2018/0164831 A1* | 6/2018 | Han | B60R 1/00 |

FOREIGN PATENT DOCUMENTS

| | | |
|---|---|---|
| EP | 1332948 | 8/2003 |
| JP | 2013-241087 | 12/2013 |
| KR | 10-2013-0052863 | 5/2013 |
| WO | 2017/072959 | 1/2018 |

* cited by examiner

USER INTERFACE APPARATUS FOR VEHICLE AND VEHICLE

CROSS-REFERENCE TO RELATED APPLICATION

This application claims the benefit of an earlier filing date and right of priority to Korean Patent Application No. 10-2017-0066276, filed on May 29, 2017 in the Korean Intellectual Property Office, the disclosure of which is incorporated herein by reference.

TECHNICAL FIELD

The present disclosure relates to a user interface apparatus for vehicle.

BACKGROUND

A vehicle is an apparatus that moves in a direction desired by a user riding therein. A representative example of a vehicle may be an automobile.

Vehicles typically implement various types of user-convenience systems. For example, there have been efforts to develop automated vehicle parking systems that facilitate parking of a vehicle. In particular, research has been conducted into parking systems that not only assist a driver to perform manual parking, but also to perform autonomous parking of the vehicle.

SUMMARY

Implementations disclosed herein provide a user interface apparatus for a vehicle that provides information to a user so that the user in a vehicle is better able to recognize various parking situations of the vehicle while the vehicle is being automatically (or autonomously) parked.

In one aspect, a user interface apparatus for a vehicle includes: a display unit; an interface unit configured to receive information; at least one processor; and a computer-readable medium having stored thereon instructions that, when executed by the at least one processor, causes the at least one processor to perform operations that include: receiving, through the interface unit, first information regarding a planned autonomous parking operation of the vehicle; receiving, through the interface unit, second information regarding a progress of an autonomous parking maneuver being performed by the vehicle based on the planned autonomous parking operation; displaying, through the display unit, a graphic object that corresponds to the first information regarding the planned autonomous parking operation of the vehicle; and controlling the display unit to apply an animation effect to the graphic object being displayed, wherein the animation effect corresponds to the second information regarding the progress of the autonomous parking maneuver being performed by the vehicle.

In some implementations, the first information regarding the planned autonomous parking operation of the vehicle includes at least one of: turn-around planning information indicating at least one planned driving operation that changes a driving direction from forward to reverse or from reverse to forward, forward driving planning information indicating at least one planned forward driving operation, reverse driving planning information indicating at least one planned reverse driving operation, left-steering planning information indicating at least one planned left-steering driving operation, or right-steering planning information indicating at least one planned right-steering driving operation. In such implementations, the second information regarding the progress of the autonomous parking maneuver being performed by the vehicle includes at least one of: turn-around driving maneuver information indicating at least one driving maneuver in which the vehicle changes a driving direction from forward to reverse or from reverse to forward, forward driving maneuver information indicating at least one forward driving maneuver by the vehicle, reverse driving maneuver information indicating at least one reverse driving maneuver by the vehicle, left-steered driving maneuver information indicating at least one left-steered driving maneuver by the vehicle, or right-steered driving maneuver information indicating at least one right-steered driving maneuver by the vehicle.

In some implementations, the operations further include: displaying, through the display unit and based on the turn-around planning information, a graphic object that is divided into a plurality of sections; and controlling the display unit based on the second information to progressively change at least one of a color, a shape, or a transparency of the plurality of sections of the graphic object.

In some implementations, controlling the display unit to progressively change at least one of a color, a shape, or a transparency of the plurality of sections of the graphic object includes: changing the at least one of a color, a shape, or a transparency of the plurality of sections from a first level to an intermediate level that is between the first level and a second level; and changing the at least one of a color, a shape, or a transparency of the plurality of sections from the intermediate level to the second level.

In some implementations, controlling the display unit to progressively change at least one of a color, a shape, or a transparency of the plurality of sections of the graphic object includes: continuously changing the at least one of a color, a shape, or a transparency of the plurality of sections from the first level to the second level.

In some implementations, displaying the graphic object that is divided into the plurality of sections includes: distinguishing at least one forward driving section that corresponds to the at least one planned forward driving operation and at least one reverse driving section that corresponds to the least one planned reverse driving operation.

In some implementations, the first information further includes forward distance planning information indicating a forward driving distance of a planned forward driving operation and reverse distance planning information indicating a reverse driving distance of a planned reverse driving operation. The operations further include: setting at least one of a color, a shape, or a transparency of the at least one forward driving section of the graphic object based on the forward distance planning information; and setting at least one of a color, a shape, or a transparency of the at least one reverse driving section of the graphic object based on the reverse distance planning information.

In some implementations, the second information further includes forward driving speed information indicating a forward driving speed of a planned forward driving operation and reverse driving speed information indicating a reverse driving speed of a planned reverse driving operation. The operations further include: controlling the display unit based on the forward driving speed information to adjust a speed at which the at least one of the color, the shape, or the transparency of the forward driving section of the graphic object is changed; and controlling the display unit based on the reverse driving speed information to adjust a speed at which at least one of the color, the shape, or the transparency of the reverse driving section of the graphic object is changed.

In some implementations, displaying, based on the turn-around planning information, the graphic object that is divided into the plurality of sections includes: displaying, based on the turn-around planning information, a progress bar that is divided into a plurality of sections. In such implementations, controlling the display unit based on the second information to change the at least one of the color, the shape, or the transparency of the plurality of sections of the graphic object includes: controlling the display unit based on the second information to change a color of the progress bar along the plurality of sections in a first direction.

In some implementations, the operations further include: controlling the display unit so that a first section of the progress bar corresponding to a planned forward driving operation is alternately displayed in the progress bar with a second section of the progress bar corresponding to a planned reverse driving operation.

In some implementations, the operations further include: controlling the display unit so that a plurality of first section including the first section and a plurality of second sections including the second section are alternatively and repeatedly displayed, the plurality of first sections corresponding to the at least one planned forward driving operation and the plurality of second sections corresponding to the at least one planned reverse driving operation.

In some implementations, the first information further includes: forward distance planning information indicating a forward driving distance of a planned forward driving operation; and reverse distance planning information indicating a reverse driving distance of a planned reverse driving operation. In such implementations, the second information further includes: forward driving distance information indicating a forward driving distance that the vehicle drives based on the forward distance planning information; and reverse driving distance information indicating a reverse driving distance that the vehicle drives based on reverse distance planning information.

In some implementations, the operations further include: setting a displayed length of the first section of the progress bar based on the forward distance planning information; setting a displayed length of the second section of the progress bar based on the reverse distance planning information; and controlling the display unit to change a color of the progress bar at a constant speed.

In some implementations, the operations further include: setting a length of the first section of the progress bar and a length of the second section of the progress bar to be uniform; based on the forward driving distance information, adjusting a speed at which a color of the first section of the progress bar is changed; and based on the reverse driving distance information, adjusting a speed at which a color of the second section of the progress bar is changed.

In some implementations, the operations further include: controlling the display unit to display, in a vicinity of the plurality of sections of the progress bar, one of a left-indicating arrow corresponding to left-steered driving maneuver information or a right-indicating arrow corresponding to right-steered driving maneuver information.

In some implementations, the operations further include: displaying, based on the first information, a circular graphic object corresponding to the first information; and controlling the display unit, based on the second information, to change a color of the displayed circular graphic object.

In some implementations, the operations further include: displaying the circular graphic object as a first donut-shaped graphic object corresponding to the first information; displaying a second donut-shaped graphic object corresponding to the turn-around planning information; and controlling the display unit, based on the forward driving maneuver information and based on the reverse driving maneuver information, to change a color of the second donut-shaped graphic object in a first direction.

In some implementations, the operations further include: controlling the display unit to reset the color of the second donut-shaped graphic object at a turn-around maneuver time that corresponds to the vehicle changing the driving direction from forward to reverse or from reverse to forward.

In some implementations, the operations further include: based on the left-steered driving maneuver information and the right-steered driving maneuver information, determining a direction in which the color of the second donut-shaped graphic object is changed.

In some implementations, the operations further include: displaying a vehicle image; and based on at least one of the forward driving maneuver information, the reverse driving maneuver information, the left-steered driving maneuver information, or the right-steered driving maneuver information, controlling the display unit to change a color of the vehicle image from a first color to a second color in a gradual manner in a first direction along the vehicle image.

In some implementations, the operations further include: controlling the display unit, based on the forward driving maneuver information, to change the color of the vehicle image from the first color to the second color in a direction from a front end of the vehicle image to a rear end of the vehicle image; and controlling the display unit, based on the reverse driving maneuver information, to change the color of the vehicle image from the first color to the second color in a direction from the rear end of the vehicle image to the front end of the vehicle image.

In some implementations, the operations further include: controlling the display unit, based on the left-steered driving maneuver information and the right-steered driving maneuver information, to change the color of the vehicle image from the first color to the second color so that a boundary formed between the first color and the second color is inclined at a first angle.

In some implementations, the operations further include: controlling the display unit, based on the forward driving maneuver information and the reverse driving maneuver information, to change the color of the vehicle image from the first color to the second color so that a color of at least one region of the vehicle image is gradually changed.

In some implementations, the operations further include: controlling the display unit, based on the left-steered driving maneuver information and the right-steered driving maneuver information, to change a position of the at least one region within the vehicle image for which the color is gradually changed.

In some implementations, displaying the graphic object that is divided into the plurality of sections includes: determining, based on the turn-around planning information, at least one forward driving portion and at least one reverse driving portion of the planned autonomous parking operation of the vehicle; and displaying the plurality of sections of the graphic object as alternating sections corresponding to the at least one forward driving portion and the at least one reverse driving portion of the planned autonomous parking operation of the vehicle.

In another aspect, a user interface apparatus for a vehicle includes a display unit; an interface unit configured to receive first information regarding a planned autonomous parking operation of the vehicle and second information regarding a progress of an autonomous parking maneuver being performed by the vehicle based on the planned autonomous parking operation; and at least one processor. The at least one processor is configured to: display, through the display unit, a graphic object that corresponds to the first information regarding the planned autonomous parking operation of the vehicle; and control the display unit to apply an animation effect to the graphic object being displayed, wherein the animation effect corresponds to the second information regarding the progress of the autonomous parking maneuver being performed by the vehicle.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

In some scenarios, when automatic parking of a vehicle is performed with a user in the vehicle, the user may not be aware of a parking state of the vehicle. For example, if forward driving is transitioned to reverse driving, or vice-versa, during automated parking of a vehicle while a user is seated inside the vehicle, then the user may feel discomfort or may be injured if the user is not expecting such a transition.

Implementations disclosed herein may mitigate such challenges by analyzing information regarding both a planned parking operation of the vehicle as well as an actual progress of parking by the vehicle relative to the planned parking operation, and display information to the user regarding a state of the vehicle during the parking operation.

In some implementations, a user interface apparatus may receive both first information regarding a planned autonomous parking operation of the vehicle, and second information regarding a progress of an autonomous parking maneuver being performed by the vehicle based on the planned autonomous parking operation. Based on both types of information, the user interface apparatus may display information to the user that dynamically shows the vehicle's progress through the planned parking operation.

In some scenarios, implementations described herein have one or more effects as follows.

First, the user interface apparatus may provide a user with information about autonomous parking planning and information about a progress situation of an autonomous parking maneuver.

Second, the user interface apparatus may provide a user with information about one or more turn-around times at which the vehicle changes from a forward to a reverse driving operation, or vice-versa.

Third, by providing such information as a graphic object that is easily recognizable for a user, the user interface apparatus may provide intuitive information regarding even complex parking operations.

Effects of the present disclosure are not limited to the aforementioned effects and other unmentioned effects will be clearly understood by those skilled in the art from the claims.

A vehicle as described in this specification may include any suitable motorized vehicle, such as an automobile or a motorcycle. Hereinafter, a description will be given based on an automobile.

A vehicle as described in this specification may be powered by any suitable source of power, and may include as examples an internal combustion engine vehicle including an engine as a power source, a hybrid vehicle including both an engine and an electric motor as a power source, or an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 1:
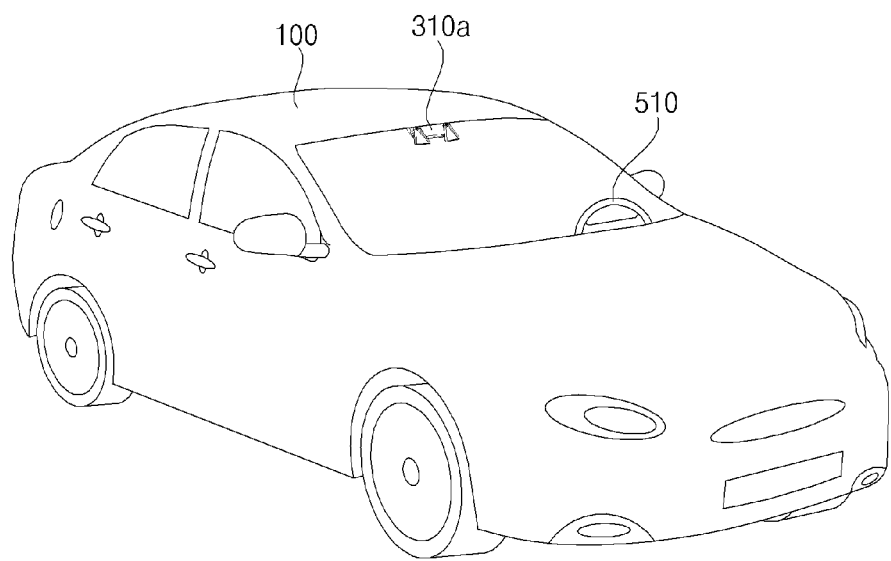
FIG. 1 is a diagram illustrating an example of an external appearance of a vehicle according to an implementation.
Figure 1:
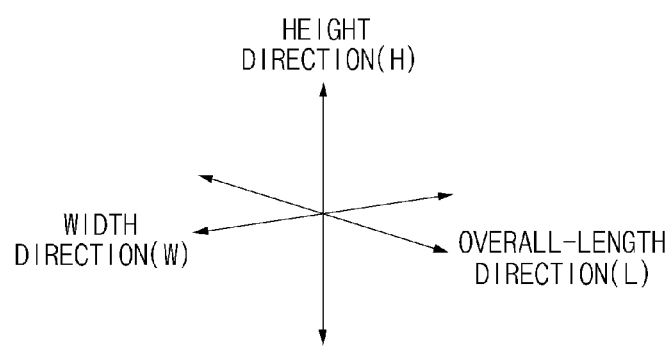

FIG. 1 is a view of the external appearance of a vehicle according to an implementation.

Figure 2:
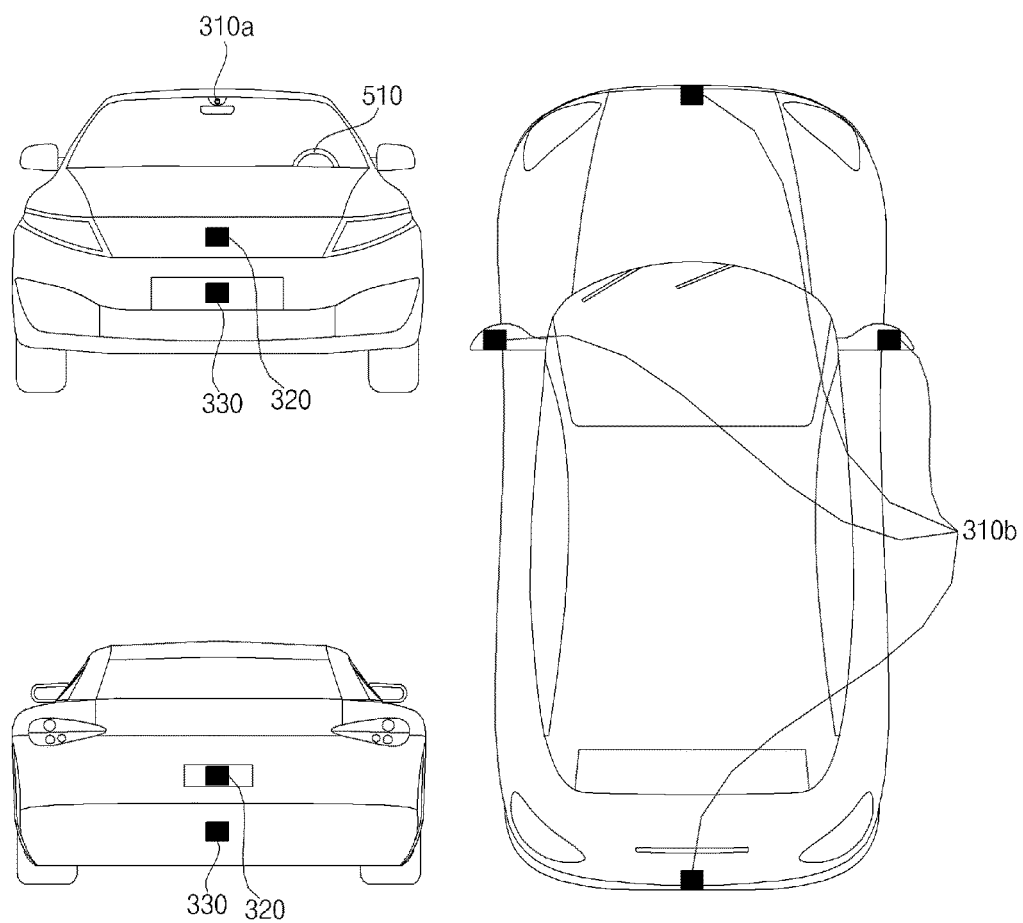
FIG. 2 is a diagram illustrating an example of different angled views of the external appearance of a vehicle according to an implementation.

FIG. 2 is different angled views of a vehicle according to an implementation.

Figure 3:
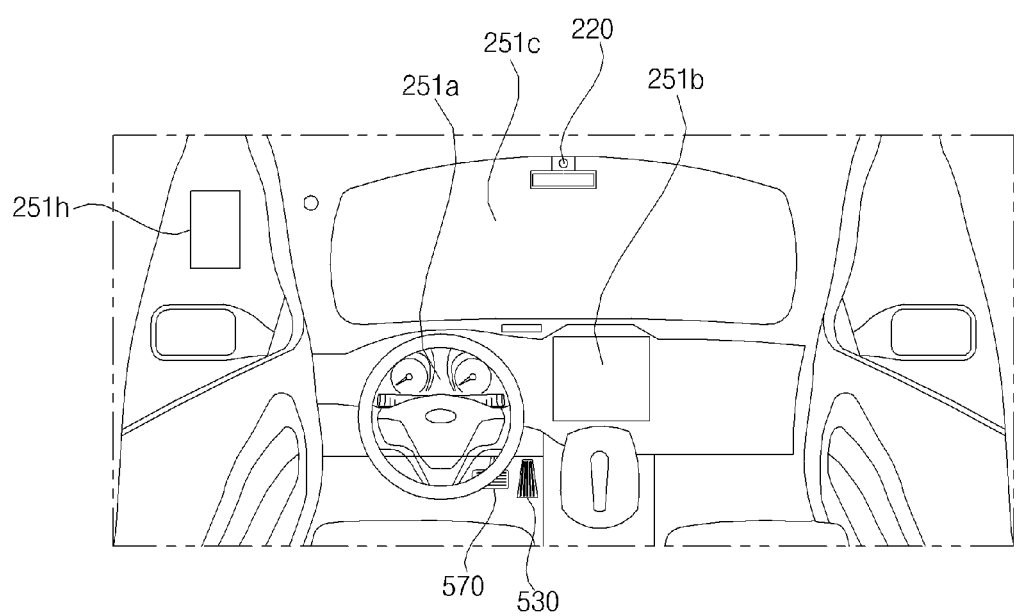
FIGS. 3 and 4 are diagrams illustrating examples of an interior configuration of a vehicle according to an implementation.
Figure 4:
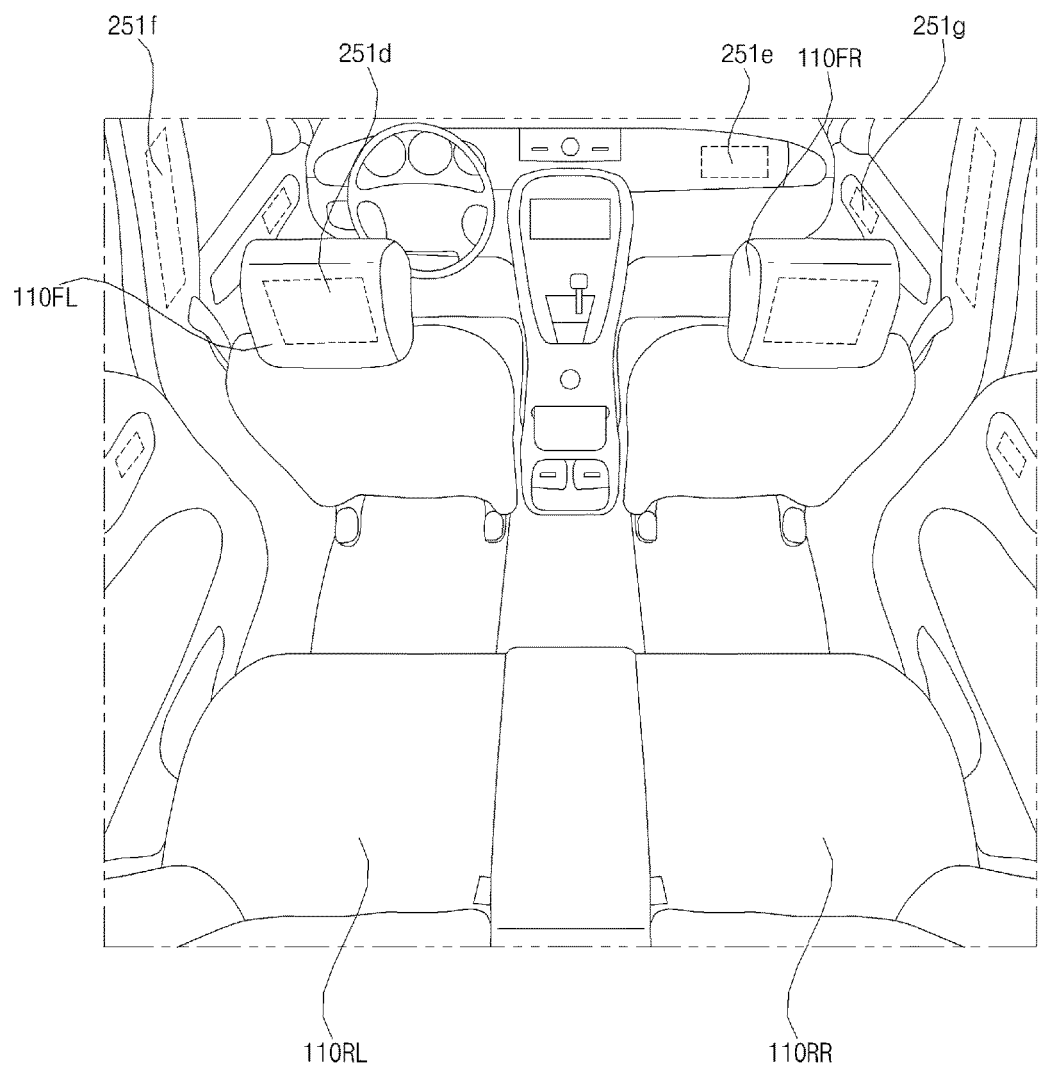

FIGS. 3 and 4 are views of the internal configuration of a vehicle according to an implementation.

Figure 5:
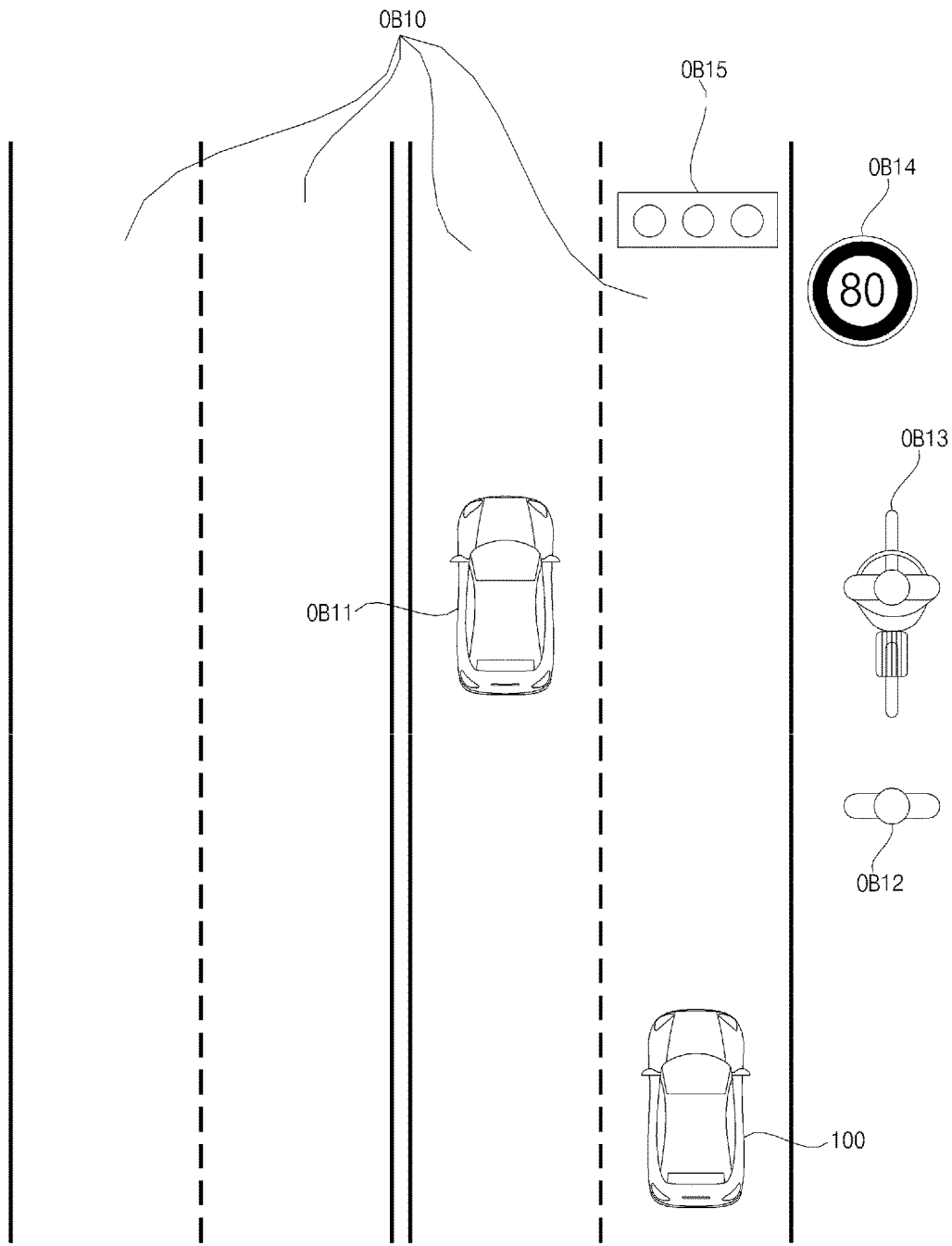
FIGS. 5 and 6 are diagrams illustrating examples of an object that may be detected according to an implementation.
Figure 6:
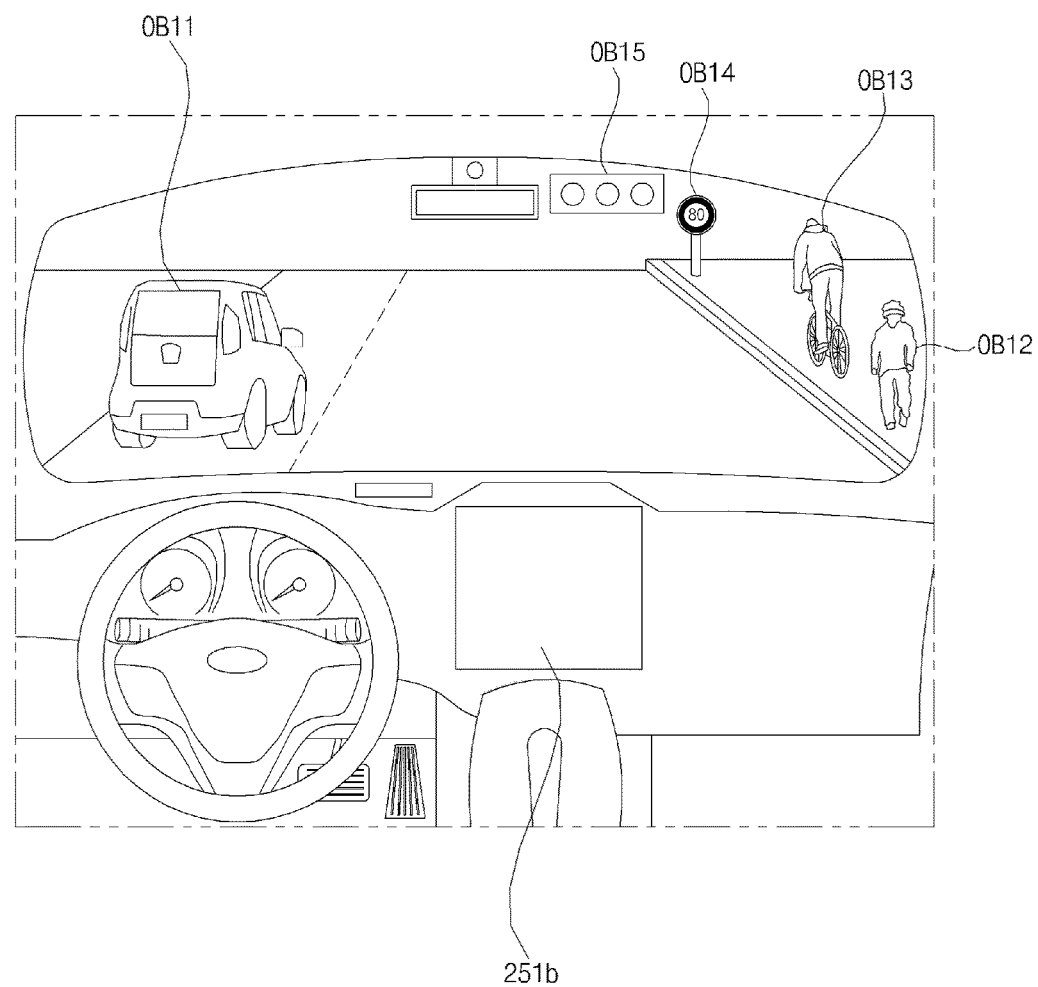

FIGS. 5 and 6 are views for explanation of objects according to an implementation.

Figure 7:
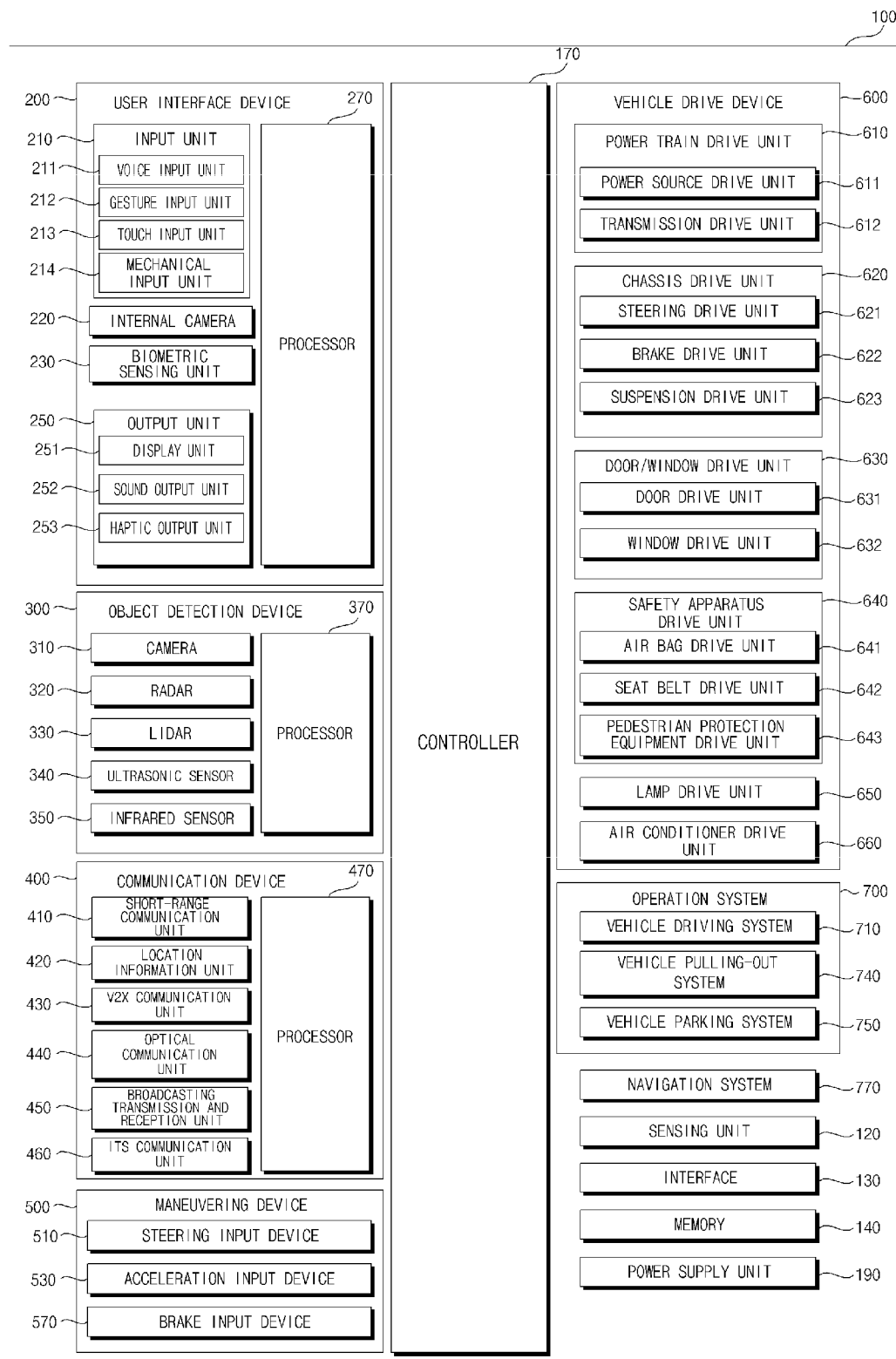
FIG. 7 is a block diagram illustrating an example of a vehicle according to an implementation.

FIG. 7 is a block diagram illustrating a vehicle according to an implementation.

Referring to FIGS. 1 to 7, a vehicle 100 may include a plurality of wheels, which are rotated by a power source, and a steering input device 510 for controlling a driving direction of the vehicle 100.

In some implementations, the vehicle 100 may be an autonomous vehicle that autonomously performs one or more driving operations of the vehicle 100.

In some scenarios, the vehicle 100 may switch between an autonomous driving mode or a manual mode in response to a user input.

For example, in response to a user input received through a user interface apparatus 200, the vehicle 100 may switch from a manual mode to an autonomous driving mode, or vice versa.

The vehicle 100 may switch to the autonomous driving mode or to the manual mode based on driving situation information.

The driving situation information may include at least one of the following: information on an object located outside the vehicle 100, navigation information, and vehicle state information.

For example, the vehicle 100 may switch from the manual mode to the autonomous driving mode, or vice versa, based on driving situation information generated by the object detection apparatus 300.

For example, the vehicle 100 may switch from the manual mode to the autonomous driving mode, or vice versa, based on driving situation information received through a communication apparatus 400.

The vehicle 100 may switch from the manual mode to the autonomous driving mode, or vice versa, based on information, data, and a signal provided from an external device.

When the vehicle 100 operates in the autonomous driving mode, the autonomous vehicle 100 may operate based on a vehicle travel system 700.

For example, the autonomous vehicle 100 may operate based on information, data, or signals generated by a driving system 710, a parking-out system 740, and a parking system 750.

While operating in the manual mode, the autonomous vehicle 100 may receive a user input for driving of the vehicle 100 through a driving manipulation apparatus 500. In response to the user input received through the driving manipulation apparatus 500, the vehicle 100 may operate.

The term "overall length" refers to the length from the front end to the rear end of the vehicle 100, the term "overall width" refers to the width of the vehicle 100, and the term "overall height" refers to the height from the bottom of the wheel to the roof. In the following description, the term "overall length direction L" refers to the reference direction for the measurement of the overall length of the vehicle 100, the term "overall width direction W" refers to the reference direction for the measurement of the overall width of the vehicle 100, and the term "overall height direction H" refers to the reference direction for the measurement of the overall height of the vehicle 100.

As illustrated in FIG. 7, the vehicle 100 may include the user interface apparatus 200, the object detection apparatus 300, the communication apparatus 400, the driving manipulation apparatus 500, a vehicle drive apparatus 600, the vehicle travel system 700, a navigation system 770, a sensing unit 120, an interface 130, a memory 140, at least one processor such as controller 170, and a power supply unit 190.

In some implementations, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and at least one processor such as processor 270.

In some implementations, the user interface apparatus 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense a 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface apparatus 200 may include a plurality of display units 251a to 251g.

The display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface apparatus 200.

In some implementations, the user interface apparatus 200 may include a plurality of processors 270 or may not include the processor 270.

In the case where the user interface apparatus 200 does not include the processor 270, the user interface apparatus 200 may operate under control of the controller 170 or at least one processor of a different device inside the vehicle 100.

In some implementations, the user interface apparatus 200 may be referred to as a display device for vehicle.

The user interface apparatus 200 may operate under control of the controller 170.

The object detection apparatus 300 is configured to detect an object outside the vehicle 100. The object detection apparatus 300 may generate information on the object based on sensing data.

The information on the object may include information about the presence of the object, location information of the object, information on a distance between the vehicle 100 and the object, and information on a speed of movement of the vehicle 100 relative to the object.

The object may include various types of objects related to travelling of the vehicle 100.

Referring to FIGS. 5 and 6 as examples, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may refer to various types of lanes in a road around the vehicle 100. As examples, the lane OB10 may be a lane in which the vehicle 100 is traveling, a lane next to the lane in which the vehicle 100 is traveling, or a lane in which a different vehicle is travelling in the opposite direction. The lane OB10 may include left and right lines that define the lane. The lane OB10 may include an intersection.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person located in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, a bridge, a curb, and a wall.

The geographical feature may include a mountain and a hill.

In some implementations, the object may be classified as a movable object or a stationary object. For example, the movable object may include a moving nearby vehicle or a moving pedestrian. For example, the stationary object may include a traffic signal, a road, a structure, a stopped nearby vehicle, or a stopped pedestrian.

The object detection apparatus 300 may include a camera 310, a radar 320, a lidar 330, an ultrasonic sensor 340, an infrared sensor 350, and at least one processor such as processor 370.

In some implementations, the object detection apparatus 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

Using various image processing algorithms, the camera 310 may acquire location information of an object, information on a distance to the object, and information on speed relative to the object.

For example, based on change in size over time of an object in acquired images, the camera 310 may acquire information on a distance to the object and information on speed relative to the object.

For example, the camera 310 may acquire the information on a distance to the object and the information on speed relative to the object, by using a pin hole model or profiling a road surface.

For example, the camera 310 may acquire the information on a distance to the object and the information on the speed relative to the object, based on information on disparity in stereo images acquired by a stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

For example, the camera 310 may be disposed near a rear glass in the vehicle 100 in order to acquire images of the rear of the vehicle 100. Alternatively, the camera 310 may be disposed around a rear bumper, a trunk, or a tailgate.

For example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100. The vehicle 100 may include a plurality of non-driving type lidars 330.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection apparatus 300.

The processor 370 may detect or classify an object by comparing pre-stored data with data sensed by the camera 310, the radar 320, the lidar 330, the ultrasonic sensor 340, and the infrared sensor 350.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

For example, the processor 370 may acquire information on the distance to the object or information on the speed relative to the object by using a pin hole model or by profiling a road surface.

For example, the processor 370 may acquire information on the distance to the object and information on the speed relative to the object based on information on disparity in stereo images acquired from the stereo camera 310a.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

In some implementations, the object detection apparatus 300 may include a plurality of processors 370 or may not include the processor 370. For example, each of the camera 310, the radar 320, the lidar 330, the ultrasonic sensor 340, and the infrared sensor 350 may include its own processor.

In the case where the object detection apparatus 300 does not include the processor 370, the object detection apparatus 300 may operate under control of the controller 170 or at least one processor inside the vehicle 100.

The object detection apparatus 300 may operate under control of the controller 170.

The communication apparatus 400 is configured to perform communication with an external device. Here, the external device may be a nearby vehicle, a mobile terminal, or a server.

To perform communication, the communication apparatus 400 may include at least one selected from among a transmission antenna, a reception antenna, a Radio Frequency (RF) circuit configured to implement various communication protocols, and an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and at least one processor such as processor 470.

In some implementations, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic volume information from the traffic system and provide the traffic volume information to the controller 170. In another example, the ITS communication unit 460 may receive a control signal from the traffic system, and provide the control signal to the controller 170 or a processor provided in the vehicle 100.

The processor 470 may control the overall operation of each unit of the communication apparatus 400.

In some implementations, the communication apparatus 400 may include a plurality of processors 470, or may not include the processor 470.

In the case where the communication apparatus 400 does not include the processor 470, the communication apparatus 400 may operate under control of the controller 170 or a processor of a device inside of the vehicle 100.

In some implementations, the communication apparatus 400 may implement a vehicle display device, together with the user interface apparatus 200. In this case, the vehicle display device may be referred to as a telematics device or an Audio Video Navigation (AVN) device.

The communication apparatus 400 may operate under control of the controller 170.

The driving manipulation apparatus 500 is configured to receive a user input for driving the vehicle 100.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some implementations, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The driving manipulation apparatus 500 may operate under control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive apparatus 600 may further include other components in addition to the aforementioned components, or may not include some of the aforementioned components.

In some implementations, the vehicle drive apparatus 600 may include at least one processor. Each unit of the vehicle drive apparatus 600 may include its own processor(s).

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In the case where an electric motor is the power source, the power source drive unit 611 may control the motor. The power source drive unit 611 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some implementations, in the case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive apparatus 600 may include at least one processor. Each unit of the vehicle dive device 600 may include its own processor(s).

The vehicle drive apparatus 600 may operate under control of the controller 170.

The vehicle travel system 700 is a system for controlling the overall driving operation of the vehicle 100. The vehicle travel system 700 may operate in the autonomous driving mode.

The vehicle travel system 700 may include the driving system 710, the parking-out system 740, and the parking system 750.

In some implementations, the vehicle travel system 700 may further include other components in addition to the aforementioned components, or may not include some of the aforementioned component.

In some implementations, the vehicle travel system 700 may include at least one processor. Each unit of the vehicle travel system 700 may include its own processor(s).

In some implementations, in the case where the vehicle travel system 700 is implemented as software, the vehicle travel system 700 may implemented by one or more processors, such as the controller 170.

In some implementations, the vehicle travel system 700 may include at least one selected from among the user interface apparatus 200, the object detection apparatus 300, the communication apparatus 400, the driving manipulation apparatus 500, the vehicle drive apparatus 600, the navigation system 770, the sensing unit 120, or the controller 170.

The driving system 710 may perform driving of the vehicle 100.

The driving system 710 may perform driving of the vehicle 100 by providing a control signal to the vehicle drive apparatus 600 based on navigation information from the navigation system 770.

The driving system 710 may perform driving of the vehicle 100 by providing a control signal to the vehicle drive apparatus 600 based on information on an object received from the object detection apparatus 300.

The driving system 710 may perform driving of the vehicle 100 by providing a control signal to the vehicle drive apparatus 600 based on a signal from an external device through the communication apparatus 400.

The driving system 710 may be a system which includes at least one of the user interface apparatus 200, the object detection apparatus 300, the communication apparatus 400, the driving manipulation apparatus 500, the vehicle driving device 600, the navigation system 770, the sensing unit 120, and the controller 170, and which performs driving of the vehicle 100.

The driving system 710 may be referred to as a vehicle driving control apparatus.

The parking-out system 740 may perform an operation of pulling the vehicle 100 out of a parking space.

The parking-out system 740 may perform an operation of pulling the vehicle 100 out of a parking space, by providing a control signal to the vehicle drive apparatus 600 based on navigation information from the navigation system 770.

The parking-out system 740 may perform an operation of pulling the vehicle 100 out of a parking space, by providing a control signal to the vehicle drive apparatus 600 based on information on an object received from the object detection apparatus 300.

The parking-out system 740 may perform an operation of pulling the vehicle 100 out of a parking space, by providing a control signal to the vehicle drive apparatus 600 based on a signal received from an external device.

The parking-out system 740 may be a system which includes at least one of the user interface apparatus 200, the object detection apparatus 300, the communication apparatus 400, the driving manipulation apparatus 500, the vehicle driving device 600, the navigation system 770, the sensing unit 120, and the controller 170, and which performs an operation of pulling the vehicle 100 out of a parking space.

The parking-out system 740 may be referred to as a vehicle parking-out control apparatus.

The parking system 750 may perform an operation of parking the vehicle 100 in a parking space.

The parking system 750 may perform an operation of parking the vehicle 100 in a parking space, by providing a control signal to the vehicle drive apparatus 600 based on navigation information from the navigation system 770.

The parking system 750 may perform an operation of parking the vehicle 100 in a parking space, by providing a control signal to the vehicle drive apparatus 600 based on information on an object received from the object detection apparatus 300.

The parking system 750 may perform an operation of parking the vehicle 100 in a parking space, by providing a control signal to the vehicle drive apparatus 600 based on a signal from an external device.

The parking system 750 may be a system which includes at least one of the user interface apparatus 200, the object detection apparatus 300, the communication apparatus 400, the driving manipulation apparatus 500, the vehicle driving device 600, the navigation system 770, the sensing unit 120, and the controller 170, and which performs an operation of parking the vehicle 100.

The parking system 750 may be referred to as a vehicle parking control apparatus.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and at least one processor. The memory may store navigation information. The at least one processor may control the operation of the navigation system 770.

In some implementations, the navigation system 770 may update pre-stored information by receiving information from an external device through the communication apparatus 400.

In some implementations, the navigation system 770 may be classified as an element of the user interface apparatus 200.

The sensing unit 120 may sense the state of the vehicle. The sensing unit 120 may include an Inertial Navigation Unit (IMU) sensor, a collision sensor, a wheel sensor, a speed sensor, a gradient sensor, a weight sensor, a heading sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, a brake pedal position sensor, and a location sensor (for example, a GPS sensor).

In some implementations, the IMU sensor may include at least one of an accelerometer, a gyro sensor, and a magnetic sensor.

The sensing unit 120 may acquire sensing signals with regard to, for example, vehicle attitude information, vehicle motion information, vehicle yaw information, vehicle roll information, vehicle pitch information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle state information may be information that is generated based on data sensed by various sensors provided inside the vehicle 100.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 8:
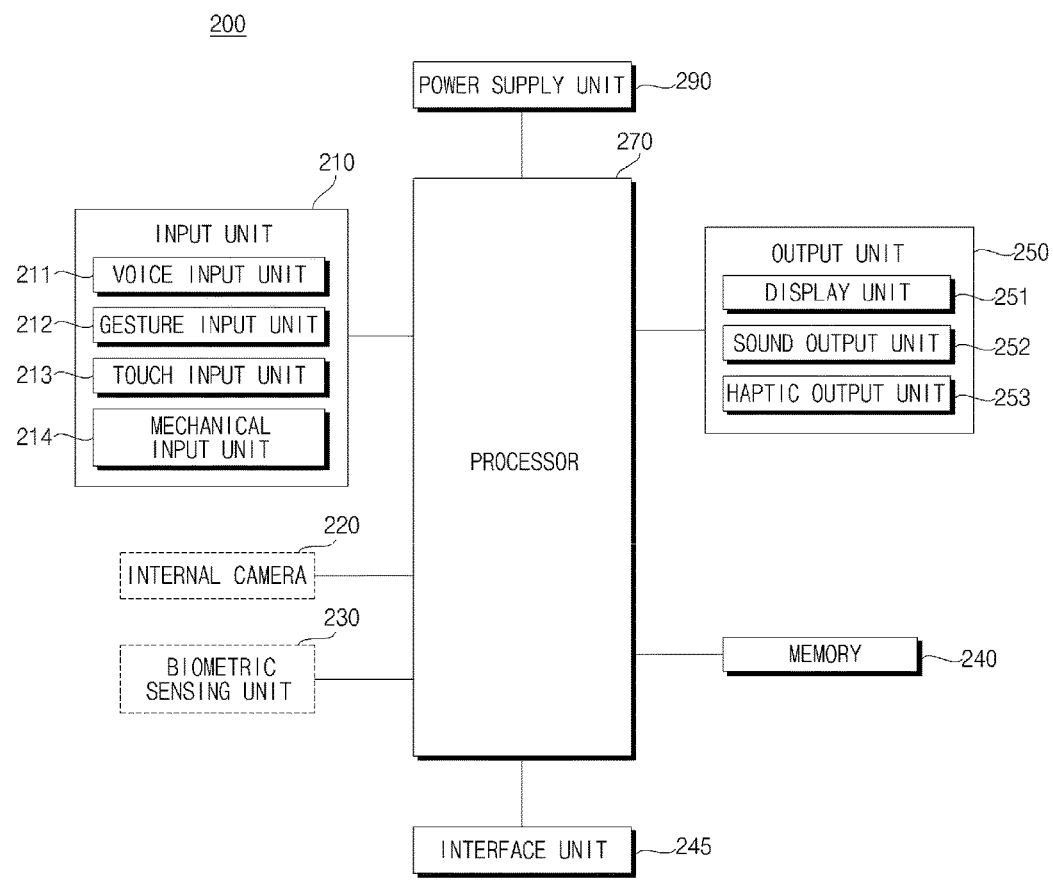
FIG. 8 is a block diagram illustrating an example of a user interface apparatus for vehicle according to an implementation.

FIG. 8 is a block diagram illustrating a user interface apparatus according for vehicle to an implementation.

Referring to FIG. 8A, a user interface apparatus 200 for vehicle may include an input unit 210, a memory 240, an interface unit 245, an output unit 250, a processor 270, and a power supply unit 290.

In some implementations, the user interface apparatus 200 may further include an internal camera 220 and a biometric sensing unit 230 individually or in combination.

The user interface apparatus 200 shown in FIG. 8 includes the elements of the user interface apparatus 200 shown in FIG. 7. Hereinafter, the same descriptions provided above with reference to FIG. 7 are omitted.

The description provided with reference to FIG. 7 may be applied to the input unit 210 and the biometric sensing unit 230.

The memory 240 is electrically connected to the processor 270. The memory 240 may store basic data of each unit, control data for controlling the operation of each unit, and input/output data. The memory 240 may be any of various hardware storage devices, such as a ROM, a RAM, an EPROM, a flash drive, and a hard drive. The memory 240 may store various data for the overall operation of the user interface 200, such as programs for the processing or control of the processor 270.

In some implementations, the memory 240 may be integrated with the processor 270, or may be an element of the processor 270.

The interface unit 245 may exchange information, data, or a signal with a different device included in the vehicle 100. The interface unit 245 may transmit the received information, data, or signal to the processor 270. The interface unit 245 may transmit information, data, or a signal generated or processed by the processor 270 to a different device included in the vehicle 100. The interface unit 245 may receive information, data, or a signal from a different device included in the vehicle 100.

The interface unit 245 may receive front view image information from the object detection apparatus 300.

The interface unit 245 may receive driving situation information.

The interface unit 245 may receive information on an object located outside the vehicle 100 from the object detection apparatus 300.

For example, the interface unit 245 may receive information on an object located in front of vehicle 100.

The interface unit 245 may receive navigation information from the navigation system 770.

The interface unit 245 may receive vehicle state information from the sensing unit 120.

For example, the interface unit 245 may receive information on a motion of the vehicle 100 from the sensing unit 120.

Information, data, or a signal received by the interface unit 245 may be provided to the processor 270.

The parking system 750 may generate first information about autonomous parking planning.

The first information about autonomous parking planning may include at least one of parking start position information, parking goal position information, parking path information, turn-around planning information, forward driving planning information, reverse driving planning information, left steering planning information, right steering planning information, forward distance planning information, reverse distance planning information, forward driving speed planning information, and reverse driving speed planning information.

The first information generated by the parking system 50 may be provided to the user interface apparatus 200.

The interface unit 245 may receive the first information about autonomous parking planning.

The interface unit 245 may transfer the first information to the processor 270.

The object detection apparatus 300 may generate second information which is about a progress situation of an autonomous parking maneuver being performed based on autonomous parking planning.

The object detection apparatus 300 may generate the second information based on sensing data generated by at least one of the camera 310, the radar 320, the lidar 330, the ultrasonic sensor 230, and the infrared sensor 350.

The sensing unit 120 may generate second information, which is about a progress situation of an autonomous parking maneuver being performed based on autonomous parking planning.

The sensing unit 120 may generate the second information based on at least one of an IMU sensor, a heading sensor, a speed sensor, a vehicle forward/backward sensor, a steering sensor, and a location sensor.

The second information about a progress situation of an autonomous parking maneuver may include at least one of vehicle location information, vehicle speed information, turn-around driving situation information, forward driving situation information, reverse driving situation information, left-steered driving situation information, and right-steered driving situation information.

Second information generated by the object detection apparatus 300 may be provided to the user interface apparatus 200.

The interface unit 245 may receive second information, which is about a progress situation of an autonomous parking maneuver being performed based on autonomous parking planning.

The interface unit 245 may transmit the second information to the processor 270.

The output unit 250 may include a display unit 251, a sound output unit 252, and a haptic output unit 253.

Description provided with reference to FIG. 7 may be applied to the output unit 250. In the following, description about the output unit 250 will be mainly about the display unit 251.

The display unit 251 may operate under the control of the processor 270/

The display unit 251 may be integrally formed with the touch input unit 213 to implement a touch screen.

When the display unit 251 is implemented as a touch screen, the display unit 251 may receive a user input.

In this case, the processor 270 may control a parking operation based on the user input received by the display unit 251.

The processor 270 may control the overall operation of each unit of the user interface apparatus 200.

The processor 270 may receive first information about autonomous parking planning from the parking system 750 through the interface unit 245.

The first information about autonomous parking planning may be defined as parking plan information necessary for the parking system 750 to perform an autonomous parking operation.

The first information may include at least one of: turn-around planning information, driving direction planning information (for example, forward driving planning information and reverse driving planning information), and steering planning information (for example, left steering planning information and right steering planning information).

The first information may further include autonomous parking path planning information.

The autonomous parking path planning information may include one or more items of sub-path planning information.

A plurality of items of sub-path planning information may match any one of forward driving planning information and reverse driving planning information.

The turn-around planning information may include information about planning of transition from forward driving to reverse driving, and information about planning of transition from reverse driving to forward driving.

The processor 270 may receive second information, which is about a progress situation of an autonomous parking maneuver being performed based on autonomous parking planning, from the object detection apparatus 300 or the sensing unit 120 through the interface unit 245.

The second information about a progress situation of autonomous parking may be defined as information about actual movement of the vehicle 100 in accordance of autonomous parking planning.

The second information may include at least one of: turn-around driving situation information, driving direction situation information (for example, forward driving situation information and reverse driving situation information), and steered situation information (for example, left-steered driving situation information and right-steered driving situation information).

The turn-around driving situation information may include information on a situation where forward driving is transitioned to reverse driving, and information on a situation where reverse driving is switched to forward driving.

The processor 270 may control the display unit 251 to display a graphic object corresponding to first information.

The graphic object may be referred to as an indicator.

The graphic object may be a figure image or a vehicle image.

The figure image includes a two-dimensional (2D) figure image and a three-dimensional (3D) figure image. The following description is mainly about a 2D figure image.

The figure image may be in any form of a bar, a circle, a donut, a polygon, a fan, and a line.

The processor 270 may control the display unit 251 based on the second information to apply an animation effect to a graphic object.

The processor 270 may control the display unit 251 based on the second information to apply a dynamic effect to a graphic object.

The processor 270 may display a figure according to turn-around planning information.

The processor 270 may display a figure that is divided into a plurality of sections according to turn-around planning information.

The processor 270 may control the display unit 251 based on the second information so that at least one of a color, a shape, and a transparency of the figure is changed.

The processor 270 may control the display unit 251 based on the second information so that at least one of a color, a shape, and a transparency of at least some of the plurality of sections is gradually changed.

The shape may include an area, a length, or a height of a figure or one section thereof.

For example, the processor 270 may control the display unit 251 based on the second information so that a color of at least some of the plurality of sections is gradually changed from a first color into a second color.

For example, the processor 270 may control the display unit 251 based on the second information so that a shape of at least some of the plurality of sections is gradually changed from a first shape into a second shape.

For example, the processor 270 may control the display unit 251 based on the second information so that a transparency of at least some of the plurality of sections is gradually changed from a first state to a second state.

The processor 270 may control the display unit 251 so that a plurality of sections of a figure is displayed in a manner of distinguishing at least one forward driving section corresponding to forward driving planning and at least one reverse driving section corresponding to reverse driving planning.

In some implementations, the processor 270 may control the display unit 251 so that a text or image indicating forward driving planning information is displayed in the forward driving section.

In some implementations, the processor 270 may control the display unit 251 so that a text or image indicating reverse driving planning information is displayed in the reverse driving section.

The first information may further include forward distance planning information and reverse distance planning information.

The first information may further include forward driving speed planning information and reverse driving speed planning information.

The forward distance planning information may be information about planning of a distance to be traveled forward.

The reverse distance planning information may be information about planning of a distance to be traveled backward.

Based on the forward distance planning information, the processor 270 may set at least one of a color, a shape, a transparency of the forward driving section.

Based on the reverse distance planning information, the processor 270 may set at least one of a color, a shape, a transparency of the reverse driving section.

The second information may further include forward driving distance information and reverse driving distance information.

The second information may further include forward driving speed information and reverse driving speed information.

Based on the forward driving speed information, the processor 270 may adjust a speed at which at least one of a color, a shape, and a transparency of the forward driving section is changed.

Based on the reverse driving speed information, the processor 270 may adjust a speed at which at least one of a color, a shape, and a transparency of the reverse driving section is changed.

The processor 270 may control the display unit 251 based on turn-around planning information so as to display a progress bar which is divided into a plurality of sections.

The processor 270 may control the display unit 251 based on the second information so that a color of the progress bar is gradually changed in one direction.

The processor 270 may control the display unit 251 so that a first section corresponding to forward driving planning and a second section corresponding to reverse driving planning are sequentially displayed in the progress bar.

The first information may include forward distance planning information and reverse distance planning information.

The second information may include forward driving distance information based on the forward driving distance planning information, and reverse driving distance information based on the reverse distance planning information.

The processor 270 may set a length of the first section based on the forward distance planning information.

The processor 270 may set a length of the second section based on reverse distance planning information.

The processor 270 may control the display unit 251 so that a color of the progress bar is changed at a constant speed.

The processor 270 may set the respective lengths of the first section and the second section to be uniform.

Based on the forward driving distance information, the processor 270 may adjust a speed at which a color of the first section is changed.

Based on the reverse driving distance information, the processor 270 may adjust a speed at which a color of the second section is changed.

The processor 270 may control the display unit 251 so that at least one of a left-indicating arrow and a right-indicating arrow is displayed in the vicinity of the plurality of sections, wherein the left-indicating arrow corresponds to left-steered driving situation information and the right-indicating arrow corresponds to right-steered driving situation information.

The processor 270 may display a first donut image corresponding to first information.

The processor 270 may control the display unit 251 based on the second information so that a color of the first donut image is gradually changed.

The processor 270 may display a second donut image corresponding to turn-around planning information.

The processor 270 may control the display unit 251 based on forward driving situation information and reverse driving situation information, so that a color of the second donut image is gradually changed in one direction.

The processor 270 may control the display unit 251 so that the second donut image is reset at a turn-around time.

Based on left-steered driving situation information and right-steered driving situation information, the processor 270 may determine a direction in which a color of the second donut image is gradually changed.

The processor 270 may display a vehicle image.

Based on at least one of forward driving situation information, reverse driving situation information, left-steered driving situation information, and right-steered driving situation information, the processor 270 may control the display unit 251 so that the vehicle image is gradually changed from a first color to a second color in one direction.

Based on the forward driving situation information, the processor 270 may control the display unit 251 so that the vehicle image is gradually changed from the first color to the second color in a direction from the front end to the rear end.

Based on the reverse driving situation information, the processor 270 may control the display unit 251 so that the vehicle image is gradually changed from the first color to the second color in a direction from the rear end to the front end.

Based on the left-steered driving situation information and the right-steered driving situation information, the processor 270 may control the display unit 251 so that a boundary formed by the first color and the second color is inclined at a specific angle.

Based on the left-steered driving situation information and the right-steered driving situation information, the processor 270 may determine the direction in which the boundary is inclined.

Based on the forward driving situation information and the reverse driving situation information, the processor 270 may control the display unit 251 so that a color of at least one region of the vehicle image is gradually changed.

Based on the left-steered driving situation information and the right-steered driving situation information, the processor 270 may control the display unit 251 so that a position of one region is changed within the vehicle image.

The processor 270 may provide a control signal to the vehicle drive apparatus 600.

The processor 270 may receive a user input through the input unit 210. The processor 270 may provide a control signal to the vehicle drive apparatus 600 based on the received user input.

The vehicle drive apparatus 600 may generate a driving signal based on a control signal received from the user interface apparatus 200.

For example, based on a control signal received from the user interface apparatus 200, at least one of the power source drive unit 611, the transmission drive unit 612, the steering drive unit 621, and the brake drive unit 622 may generate a driving signal for at least one of a power source, a transmission, a steering device, and a brake device.

Under the control of the processor 270, the power supply unit 290 may supply power required for operation of each unit of the user interface apparatus 200. In particular, the power supply unit 290 may receive power from a battery provided inside a vehicle.

Figure 9:
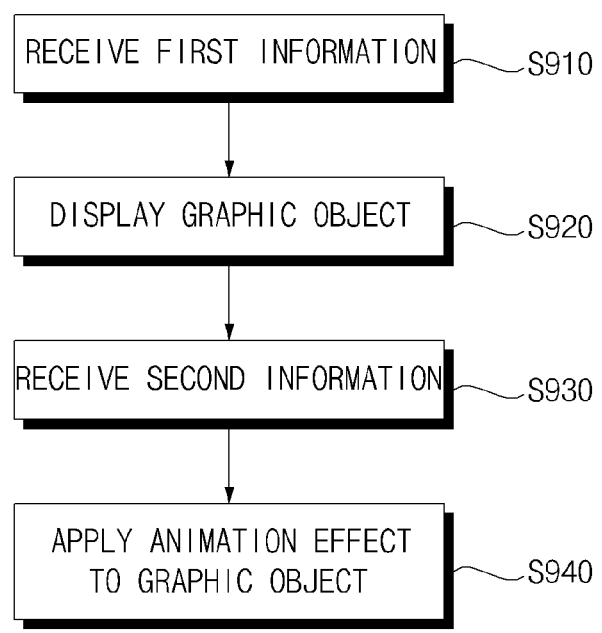
FIG. 9 is a flowchart illustrating an example of an operations of a user interface apparatus according to an implementation.

FIG. 9 is a flowchart illustrating a user interface apparatus for vehicle according to an implementation.

Referring to FIG. 9, the processor 270 may receive first information about autonomous parking planning from the parking system 750 through the interface unit 245 in S910.

The processor 270 may display a graphic object which matches the first information in S920.

The graphic object may be a graphic object which is a visual version of the first information.

For example, the processor 270 may display a figure which matches the first information.

For example, the processor 270 may display a vehicle image which matches the first information.

The processor 270 may receive second information, which is about a progress situation of an autonomous parking maneuver based on autonomous parking planning, from the object detection apparatus 300 or the sensing unit 120 through the interface unit 245 in S930.

The processor 270 may control the display unit 251 based on the second information to apply an animation effect to the graphic object in S940.

The processor 270 may apply a dynamic effect to the graphic object.

The processor 270 may control the display unit 251 so that a constituent element of the graphic object is changed over time.

Figure 10:
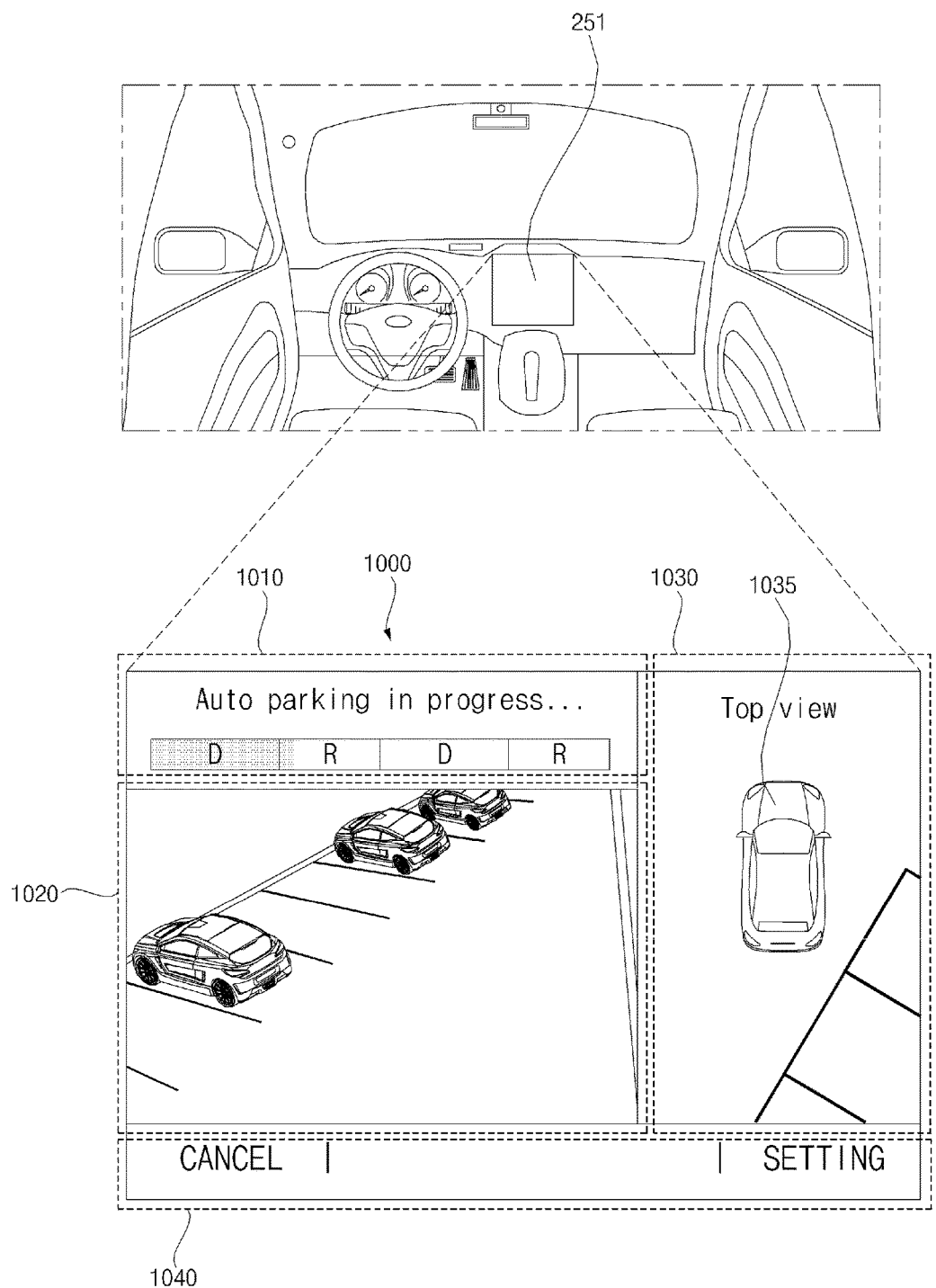
FIG. 10 is a diagram illustrating an example of an autonomous parking screen according to an implementation.

FIG. 10 is a diagram illustrating an example of an autonomous parking screen according to an implementation.

Referring to FIG. 10, the processor 270 may display an autonomous parking screen on the display unit 251.

An autonomous parking screen 1000 may include a plurality of regions 1010, 1020, 1030, and 1040.

The processor 270 may control the display unit 251 so that a graphic object corresponding to first information is displayed in a first region 1010.

The processor 270 may control the display unit 251 so that an image captured by the camera 310 is displayed in a second region 1020.

For example, the processor 270 may control the display unit 251 so that an image captured by any one of a mono camera, a stereo camera, an around-view monitor (AVM) camera, and a 360-degree camera is displayed in the second region 1020.

For example, the processor 270 may control the display unit 251 so that an image captured by a camera selected by a user from among a plurality of AVM cameras is displayed.

For example, the processor 270 may control the display unit 251 so that an image captured by a camera selected from among a plurality of AVM cameras based on driving situation information is displayed.

The processor 270 may control the display unit 251 so that an image captured by the camera 310 is processed and displayed in a third region 1030.

For example, the processor 270 may control the display unit 251 so that an image captured by any one of a mono camera, a stereo camera, an AVM camera, and a 360-degree camera is processed and displayed in the third region 1030.

For example, the processor 270 may control the display unit 251 so that an around view image generated by combining images captured by a plurality of AVM camera is displayed in the third region 1030.

The processor 270 may display a vehicle image 1035 over a processed image.

In some implementations, the processor 270 may control the display unit 251 so that a graphic object corresponding to first information is displayed in the third region 1030.

The processor 270 may control the display unit 251 so that one or more buttons are displayed in a fourth region 1040 to receive a user input.

Some of the first to fourth regions 1010 to 1040 may be omitted.

The autonomous parking screen 1000 may further include a region other than the first to fourth regions 1010 to 1040.

Figure 11A:
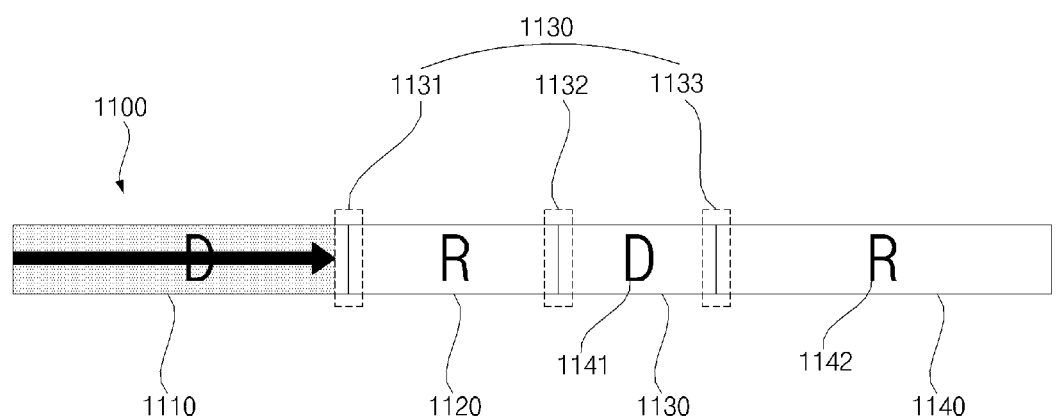
FIGS. 11A and 11B are diagrams illustrating examples of providing information based on a progress bar according to an implementation.
Figure 11B:
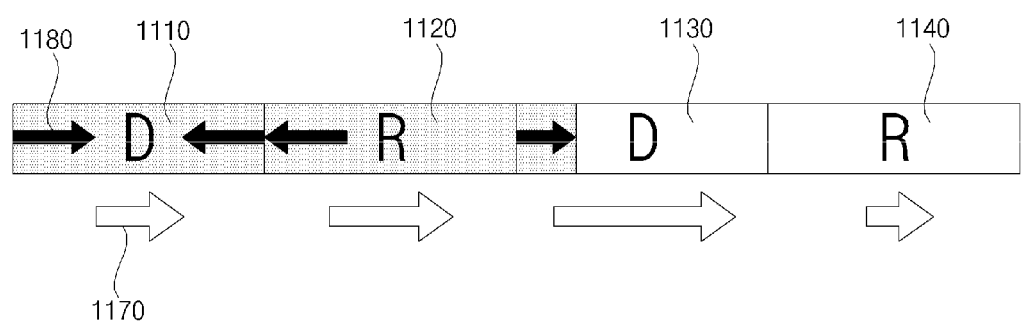

FIGS. 11A and 11B are diagrams illustrating how to provide information based on a progress bar according to an implementation.

Referring to FIG. 11A, the processor 270 may display a progress bar 1100 based on first information about autonomous parking planning.

The progress bar 1100 may be displayed in one region of the display unit 251, and may be defined as a bar-type image which extends in a horizontal, vertical, or diagonal direction.

The progress bar 1100 may include a plurality of sections 1110, 1120, 1130, and 1140 to correspond to the first information.

For example, the processor 270 may control the display unit 251 based on turn-around planning information so as to display a progress bar which is divided into a plurality of sections 1110, 1120, 1130, and 1140.

For example, the processor 270 may control the display unit 251 so that first sections 1110 and 1130 correspond to forward driving planning and second sections 1130 and 1140 correspond to reverse driving planning are alternatively displayed in the progress bar 1100.

The first sections 1110 and 1130 may be the aforementioned forward driving section. The second sections 1120 and 1140 may be the aforementioned reverse driving section.

For example, if autonomous parking planning is set to first perform forward driving planning, the processor 270 may control the display unit 251 so that the first section 1110 or 1130 is placed at the end of the progress bar 1100. If autonomous parking planning is set to perform reverse driving planning after forward driving planning, the processor 270 may control the display unit 251 so that the second section 1120 or 1140 is placed next to the first section 1110 or 1130.

For example, if autonomous parking planning is set to first perform reverse driving planning, the processor 270 may control the display unit 251 so that the second section 1120 or 1140 is placed at the end of the progress bar 1100. If autonomous parking planning is set to perform forward driving planning after reverse driving planning, the processor 270 may control the display unit 251 so that the first section 1110 is placed next to the second section 1120 or 1140.

The processor 270 may control the display unit 251 so that the first sections 1110 and 1130 and the second sections 1120 and 1140 are displayed alternatively and repeatedly.

The processor 270 may control the display unit 251 so that the first sections 1110 and 1130, whose number is as many as the number of times that forward driving planning are set to be performed according to autonomous parking planning, are placed in the progress bar 1100.

The processor 270 may control the display unit 251 so that the second sections 1120 and 1140, whose number is as many as the number of times that reverse driving planning is set to be performed according to autonomous parking planning, is placed in the progress bar 1100.

The processor 270 may control the display unit 251 so that the first sections 1110 and 1130 and the second sections 1120 and 1140 are positioned alternatively and repeatedly.

In some implementations, if autonomous parking planning consists of only forward driving planning, the processor 270 may control the display unit 251 so that only the first sections 1110 and 1130 are displayed in the progress bar 1100.

In some implementations, if autonomous parking planning consists of only reverse driving planning, the processor 270 may control the display unit 251 so that only the second sections 1120 and 1140 are displayed in the progress bar 1100.

The processor 270 may control the display unit 251 so that a partition 1130 is displayed to distinguish a plurality of sections 1110, 1120, 1130, and 1140 in the progress bar 1100.

The partition 1130 may correspond to turn-around planning.

For example, a first partition 1131 may correspond to information about planning of transition from forward driving to reverse driving.

For example, a second partition 1132 may correspond to information on transition from reverse driving to forward driving.

The processor 270 may display, in the first sections 1110 and 1130, a text 1141 which indicates forward driving planning information.

The processor 270 may display, in the second sections 1120 and 1140, a text 1142 which indicates reverse driving planning information.

The processor 270 may apply an animation effect to the progress bar 1100 based on second information which is about a progress situation of an autonomous parking maneuver being performed based on autonomous parking planning.

The processor 270 may control the display unit 251 based on the second information so that a constituent element of the progress bar 1100 is changed over time.

For example, the processor 270 may control the display unit 251 based on the second information so that at least one of a color, a shape, and a transparency of the progress bar 1100 is gradually changed.

For example, the processor 270 may control the display unit 251 based on the second information so that a color of the progress bar 1100 is gradually changed in one direction.

For example, if the vehicle 100 is travelling forward, the processor 270 may control the display unit 251 based on forward driving situation information so that a color of the first section 1110 is gradually changed in a left-to-right direction.

The processor 270 may set the size of the first section 1110 and 1130 based on forward distance planning information.

For example, if a first forward planning distance is longer than a second forward planning distance, the processor 270 may set such that a length of a 1a section 1110 corresponding to first forward distance planning information is greater than a length of a 1b section 1120 corresponding to second forward distance planning information.

The processor 270 may set lengths of the second sections 1120 and 1140 based on reverse distance planning information.

For example, if first reverse distance planning distance is shorter than second reverse planning distance, the processor 270 may set such that a length of a 2a section 1120 corresponding to first reverse distance planning information is smaller than a length of a 2b section 1140 corresponding to second reverse distance planning information.

While the first sections 1110 and 1130 and the second sections 1120 and 1130 are set to have respective lengths, the processor 270 may control the display unit 251 so that a color of the progress bar 110 is changed at a preset speed.

As illustrated in FIG. 11B, the processor 270 may set lengths of the first sections 1110 and 1130 and lengths of the second sections 1120 and 1140 to be uniform.

Based on forward driving distance information, the processor 270 may adjust a speed at which a color of the first sections 1110 and 1130 is changed.

For example, the processor 270 may adjust a speed at which a color of the first sections 1110 and 1130 is changed in proportion to a forward driving distance of the vehicle 100.

Based on reverse driving distance information, the processor 270 may adjust a speed at which a color of the second sections 1120 and 1140 is changed.

For example, the processor 270 may adjust a speed at which a color of the second sections 1120 and 1140 is changed in proportion to a reverse driving distance of the vehicle 100.

For example, the processor 270 may control the display unit 251 to further display an indicator 1170 indicative of driving speed information of the vehicle 100.

The processor 270 may control the display unit 251 so that the indicator 1170 indicative of driving speed information is displayed above, below, or inside the progress bar 1100.

The indicator 1170 may be in the shape of an arrow.

In some implementations, the processor 270 may control the display unit 251 to further display an indicator 1180 indicative of steering direction information of the vehicle 100.

The processor 270 may control the display unit 251 so that the indicator 1180 indicative of the steering direction information is displayed above, below, or inside the progress bar 1100.

The indicator 1170 may be in the shape of an arrow.

In some implementations, a left-indicating arrow corresponding to left-steered driving situation information, and a right-indicating arrow corresponding to right-steered driving situation information may be displayed within the first section 1110.

Figure 12:
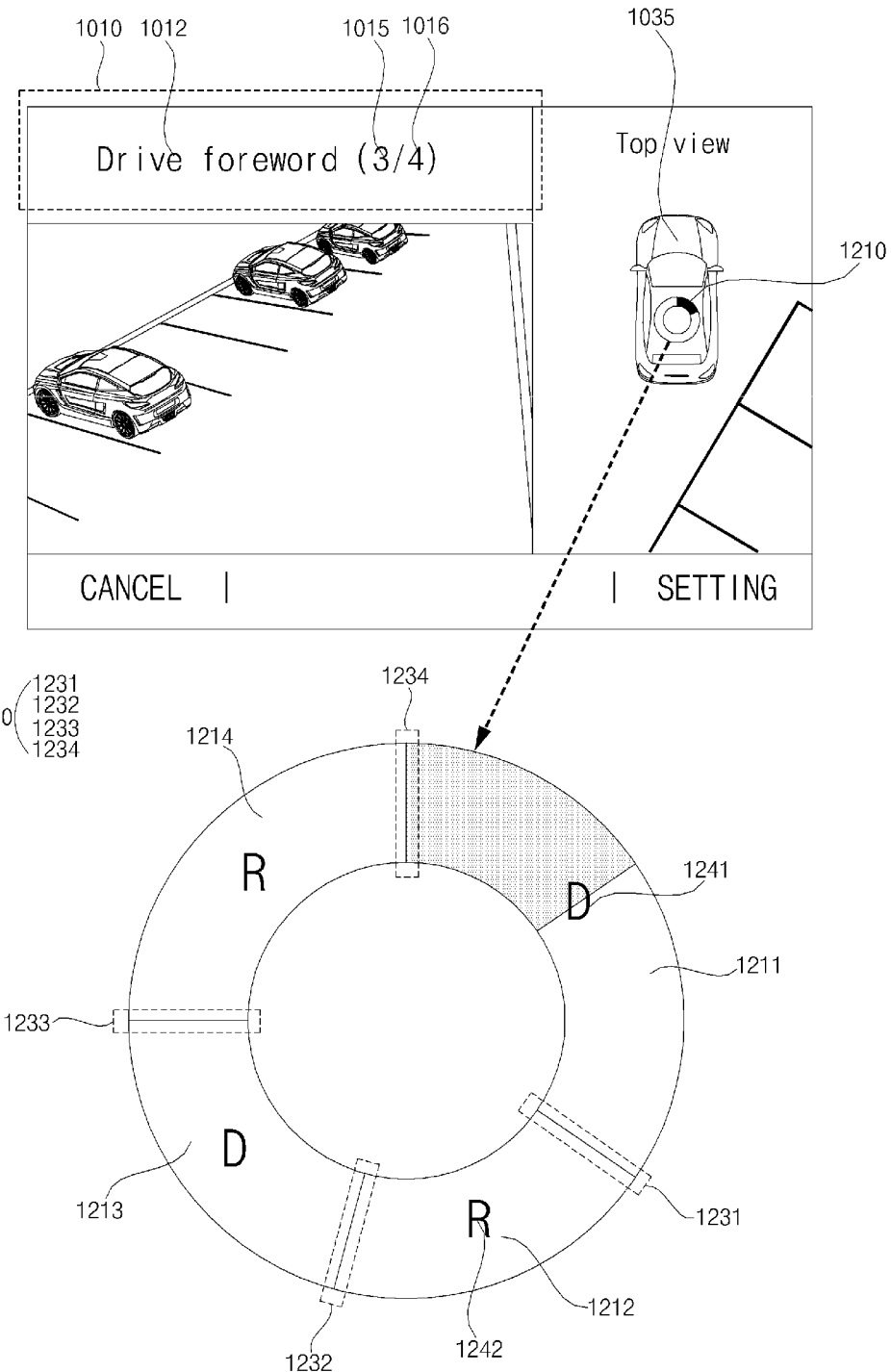
FIGS. 12 to 13B are diagrams illustrating examples of providing information based on a circular, e.g., donut-shaped, image according to an implementation.
Figure 13A:
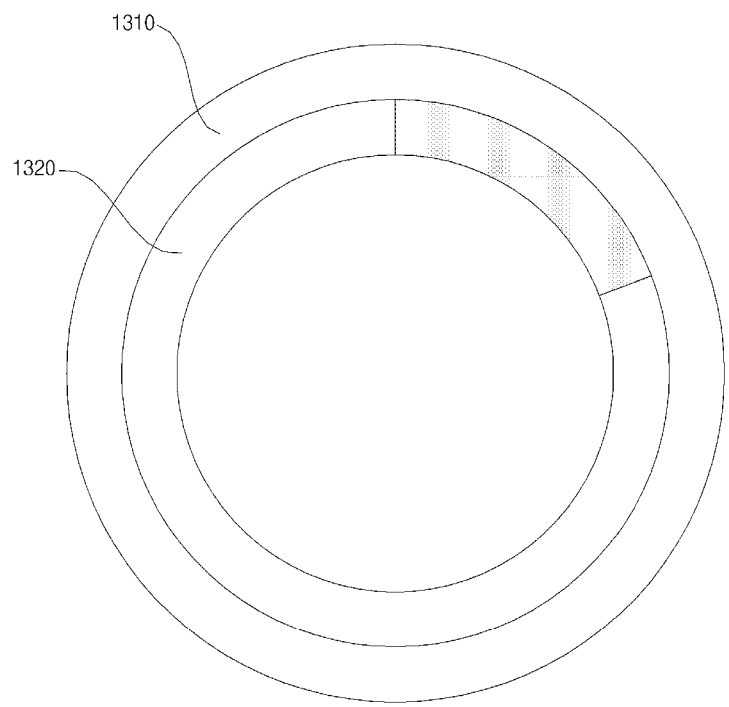
Figure 13B:
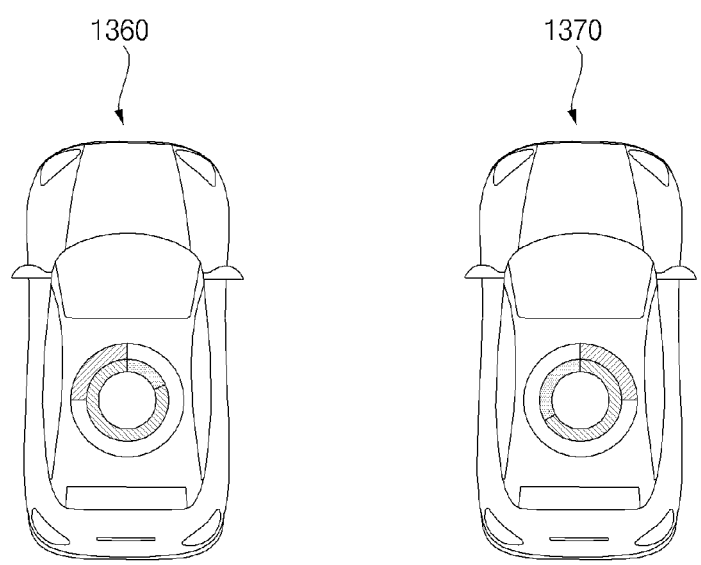

FIGS. 12 to 13B are diagrams illustrating how to provide information based on a donut image according to an implementation.

Referring to FIG. 12, the processor 270 may display a first donut image 1210 corresponding to first information about autonomous parking planning.

The processor 270 may control the display unit 251 so that the first donut image 1210 is displayed in one region of the display unit 251.

For example, the processor 270 may control the display unit 251 so that the first donut image 1210 is displayed overlapping a vehicle image 1035 which is being displayed.

For example, the processor 270 may control the display unit 251 so that the first donut image 1210 is displayed in the vicinity of the vehicle image 1035 which is being displayed.

The first donut image 1210 includes a plurality of sections 1211, 1212, 1213, and 1214 to correspond to the first information.

For example, the processor 270 may control the display unit 251 based on turn-around planning information so as to display the first donut image 1210 which is divided into the plurality of sections 1211, 1212, 1213, and 1214.

For example, the processor 270 may control the display unit 251 so that first sections 1211 and 1213 corresponding to forward driving planning and second sections 1212 and 1214 corresponding to reverse driving planning are alternatively displayed in the first donut image 1210.

The first sections 1211 and 1213 may be the aforementioned forward driving section. The second sections 1212 and 1214 may be the aforementioned reverse driving section.

The processor 270 may control the display unit 251 so that the first sections 1211 and 1213 and the second sections 1212 and 1214 are displayed alternatively and repeatedly.

The processor 270 may control the display unit 251 so that the first sections 1211 and 1213, whose number is as many as the number of times that forward driving planning is set to be performed according to autonomous parking planning, are placed in the first donut image 1210.

The processor 270 may control the display unit 251 so that the second sections 1212 and 1214, whose number is as many as the number of times the reverse driving planning is to be performed according to autonomous parking planning, are placed in the first donut image 1210.

The processor 270 may control the display unit 251 so that the first sections 1211 and 1213 and the second sections 1212 and 1214 are positioned alternatively and repeatedly.

The processor 270 may control the display unit 251 so that a partition 1230 is displayed to distinguish the plurality of sections 1211, 1212, 1213, and 1214.

The partition 1230 may correspond to turn-around planning.

For example, a first partition 1231 may correspond to information about planning of transition from forward driving to reverse driving.

For example, a second partition 1232 may correspond to information about planning of transition from reverse driving to forward driving.

The processor 270 may display, in the first sections 1211 and 1213, a text 1241 indicating information about forward driving planning.

The processor 270 may display, in the second sections 1212 and 1214, a text 1242 indicating information about reverse driving planning.

The processor 270 may apply an animation effect to the first donut image 1210 based on second information which is about a progress situation of an autonomous parking maneuver being performed based on autonomous parking planning.

The processor 270 may control the display unit 251 based on the second information so that a constituent element of the first donut image 1210 is changed over time.

For example, the processor 270 may control the display unit 251 based on the second information so that at least one of a shape, a color, and a transparency of the first donut image 1210 is gradually changed.

For example, the processor 270 may control the display unit 251 based on the second information so that a color of the first donut image 1210 is gradually changed in one direction.

For example, when the vehicle 100 is travelling forward, the processor 270 may control the display unit 251 based on forward driving situation information so that a color of the first section 1211 is gradually changed in a clockwise direction.

The processor 270 may set the size of the first sections 1211 and 1213 based on forward distance planning information.

The processor 270 may set the size of the second sections 1212 and 1214 based on reverse distance planning information.

While the first sections 1211 and 1213 and the second sections 1212 and 1214 are set to have respective lengths, the processor 270 may control the display unit 251 so that a color of the first donut image 1210 is changed at a constant speed.

In some implementations, the processor 270 may control the display unit 251 so that texts 1012, 1015, and 1016 based on the second information are displayed in the first region 1010.

For example, based on forward driving situation information, the processor 270 may display the text 1012 which indicates that forward driving is being performed.

For example, based on reverse driving situation information, the processor 270 may display a text which indicates that reverse driving is being performed.

The processor 270 may control the display unit 251 to display the texts 1015 and 1016 corresponding to autonomous parking path planning information.

The processor 270 may display the text 1016 to indicate of the number of items of sub-path planning information included in the autonomous parking path planning information.

The processor 270 may display the text 1015 to indicate a sequential number of a sub path along which the vehicle 100 is now travelling from among a plurality of items of sub-path planning information.

The processor 270 may display a text to further indicate the total number of times forward driving planning and reverse driving planning are set to be performed. The processor 270 may display a text to further indicate the number of times reverse driving has been performed so far.

Referring to FIG. 13A, the processor 270 may display a second donut image 1320 corresponding to turn-around planning information.

The processor 270 may control the display unit 251 based on forward driving situation information and reverse driving situation information so that a color of the second donut image 1320 is gradually changed in one direction.

For example, in a forward driving situation corresponding to the 1a section 1211, the processor 270 may control the display unit 251 so that a color of the second donut image 1320 is gradually changed in a clockwise direction or in a counter-clockwise direction.

Based on driving speed information or driving distance information, the processor 270 may adjust a speed at which the second donut image 1320 is changed.

The processor 270 may control the display unit 251 so that the second donut image 1320 is reset at a turn-around time.

The processor 270 may control the display unit so that the second donut image 1320 is reset at a time when a forward driving situation is transitioned into a reverse driving situation.

The processor 270 may control the display unit 251 to reset the second donut image 1320 at a time when a reverse driving situation is transitioned to a forward driving situation.

The processor 270 may control the display unit 251 so that the second donut image 1320 is reset by changing a color of the second donut image to a previous color.

The number of times the second donut image 1320 is to be reset may be determined to be as many as the number of sections included in the first donut image 1310.

The turn-around time may indicate a point in time when the vehicle 100 is transitioned from forward driving to reverse driving or from reverse driving to forward driving.

The turn-around time may be a point in time when a transmission is transitioned from a forward state to a reverse state, or vice versa.

The turn-around time may be referred to as a turn point.

The processor 270 may control the display unit 251 so that the second donut image 1320 is displayed within the first donut image 1310.

Unlike the example of FIG. 13A, the processor 270 may control the display unit 251 so that the first donut image 1310 is displayed within the second donut image 1320.

Referring to FIG. 13B, based on left-steered driving situation information and right-steered driving situation information, the processor 270 may determine a direction in which a color of a first donut image 1310 and a second donut image 1320 is gradually changed.

For example, if left-steered driving situation information is received, the processor 270 may control the display unit 251 so that a color of the first donut image 1310 and the second donut image 1320 is gradually changed in a counter clockwise direction.

For example, if right-steered driving situation information is received, the processor 270 may control the display unit 251 so that a color of the first donut image 1310 and the second donut image 1320 is gradually changed in a clockwise direction.

FIGS. 14 to 21 are diagrams illustrating how to provide information based on a vehicle image according to an implementation.

Figure 14:
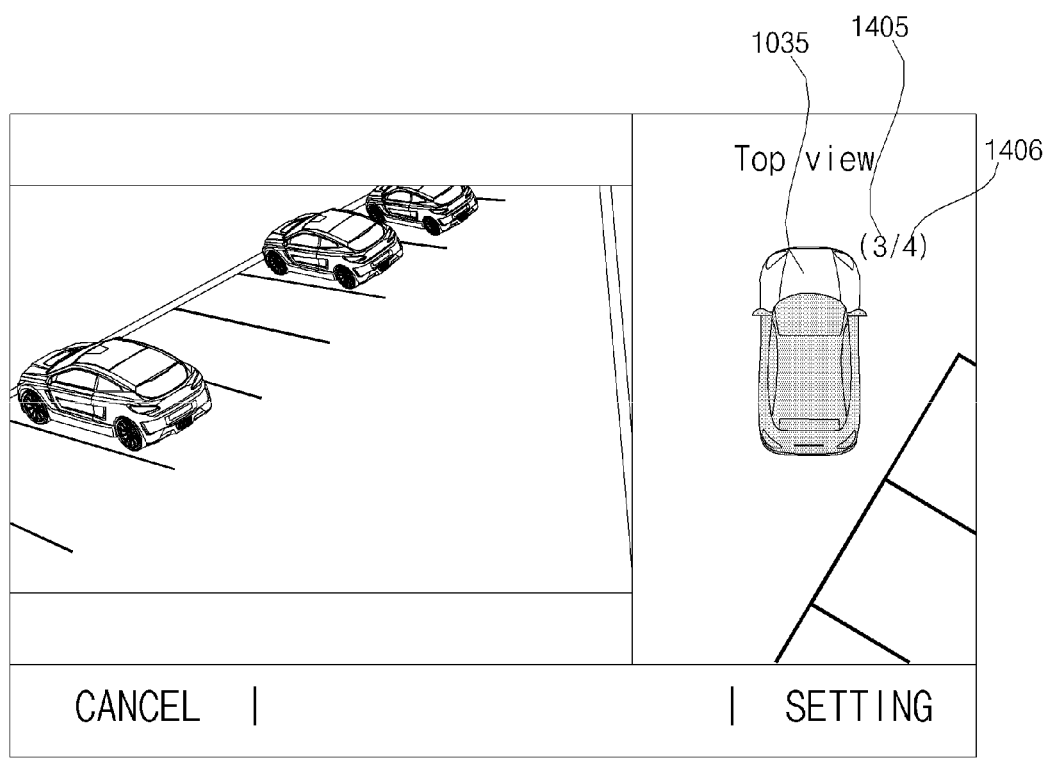
FIGS. 14 to 21 are diagrams illustrating examples of providing information based on a vehicle image according to an implementation.

Referring to FIG. 14, the processor 270 may generate and display a vehicle image 1035.

For example, the processor 270 may control the display unit 251 so that the vehicle image 1035 is displayed overlapping a top view image which is generated by combining images acquired by a plurality of AVM cameras.

The processor 270 may control the display unit 251 to display texts 1405 and 1406 which correspond to autonomous parking path planning information.

The processor 270 may display the text 1406 to indicate the number of items of sub-path planning information included in the autonomous parking path planning information.

The processor 270 may display the text 1405 to indicate a sequential number of the sub-path along which the vehicle 100 is now travelling from among a plurality of items of sub-path planning information.

The processor 270 may display the text 1406 to further indicate the total number of forward driving planning and reverse driving planning are set to be performed. The processor 270 may display the text 1405 to further indicate the number of times forward driving has been performed so far.

The processor 270 may control the display unit 251 based on the second information to apply an animation effect to the vehicle image 1035.

The processor 270 may control the display unit 251 so that a constituent element of the vehicle image 1035 is changed over time.

The processor 270 may control the display unit 251 so that at least one of a shape, a color, a transparency of the vehicle image 1035 is changed over time.

Figure 15:
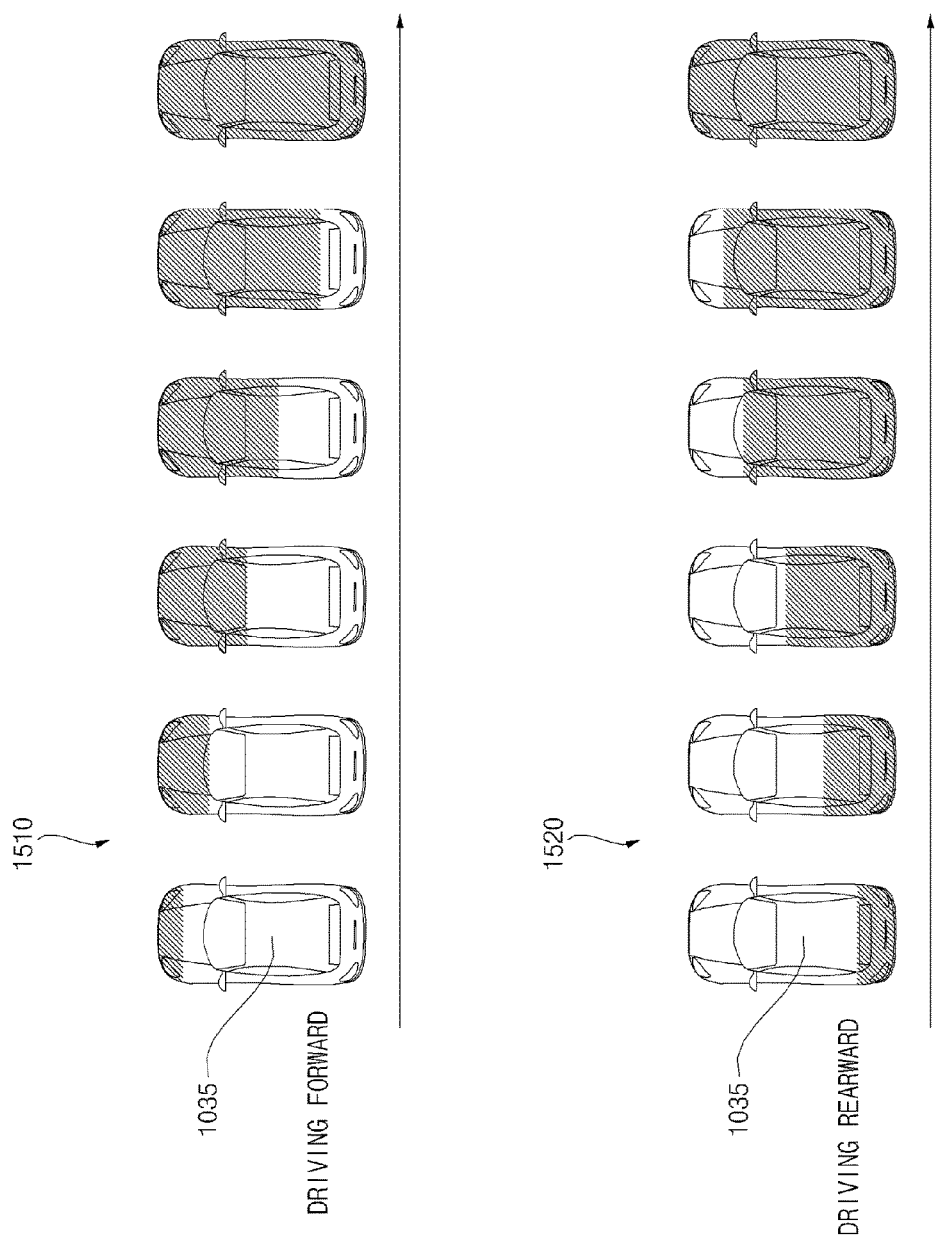

Referring to FIG. 15, the processor 270 may control the display unit 251 based on forward driving situation information or reverse driving situation information so that an animation effect is applied to the vehicle image 1035.

As shown in the example of 1510, the processor 270 may control the display unit 251 based on forward driving situation information so that the vehicle image 1035 is gradually changed from a first color to a second color in a direction from the front end to the rear end.

As shown in the example of 1520, the processor 270 may control the display unit 251 based on reverse driving situation information so that the vehicle image 1035 is changed from the first color to the second color in a direction from the rear end to the front end.

Figure 16:
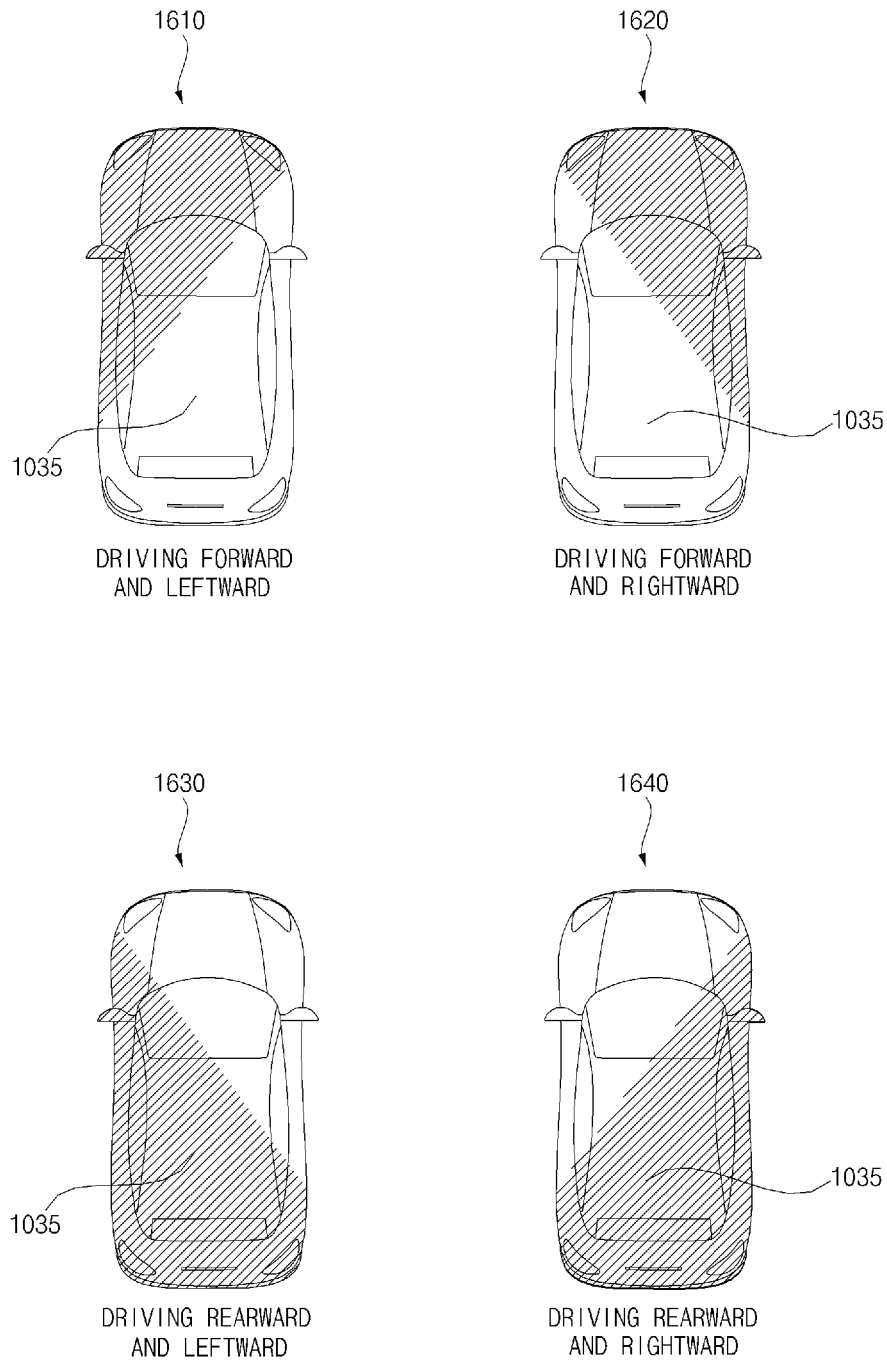

Referring to FIG. 16, the processor 270 may control the display unit 251 based on left-steered driving situation information and right-steered driving situation information so that an animation effect is applied to the vehicle image 1035.

The processor 270 may control the display unit 251 based on the left-steered driving situation information and the right-steered driving situation information so that a boundary formed by a first color and a second color is inclined at a preset angle.

Based on the left-steered driving situation information or the right-steered driving situation information, the processor 270 may determine a direction in which the boundary is inclined.

The vehicle 100 may be travelling forward while being steered to the left. In this case, as shown in the example of 1610, the processor 270 may control the display unit 251 based on left-steered driving situation information and forward driving situation information, so that a boundary formed in the vehicle image 1035 is inclined from the upper right to the lower left. At this point, the processor 270 may control the display unit 251 to display the region above the boundary in the second color and the region below the boundary in the first color.

The vehicle 100 may be travelling forward while being steered to the right. In this case, as shown in the example of 1620, the processor 270 may control the display unit 251 based on right-steered driving situation information and forward driving situation information, so that the boundary formed in the vehicle image 1035 is inclined from the upper left to the lower right. At this point, the processor 270 may control the display unit 251 to display the region above the boundary in the second color and the region below the boundary in the first color.

The vehicle 100 may be travelling in reverse while being steered to the left. In this case, as shown in the example of 1630, the processor 270 may control the display unit 251 based on left-steered driving situation information and reverse driving situation information, so that a boundary formed in the vehicle image 1035 is inclined from the upper right to the lower left. At this point, the processor 270 may control the display unit 251 to display the region above the boundary in the first color and the region below the boundary in the second color.

The vehicle 100 may be travelling in reverse while being steered to the right. In this case, as shown in the example of 1640, the processor 270 may control the display unit 251 based on right-steered driving situation information and reverse driving situation information, so that a boundary formed in the vehicle image 1035 is inclined from the upper right to the lower left. At this point, the processor 270 may control the display unit 251 to display the region above the boundary in the first color and the region below the boundary in the second color.

Figure 17:
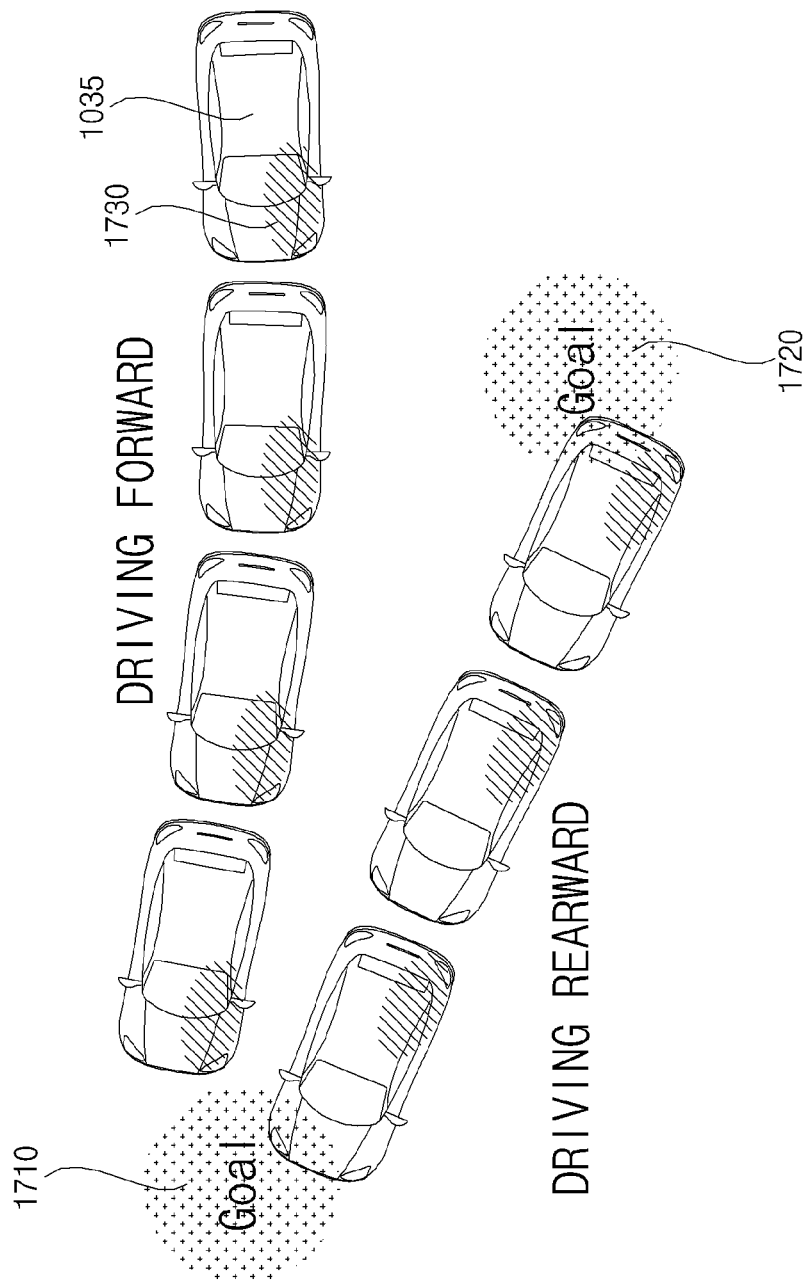

Referring to FIG. 17, the processor 270 may control the display unit 251 based on forward driving situation information or reverse driving situation information, so that a color of at least one region of the vehicle image 1035 is gradually changed.

The processor 270 may control the display unit 251 to display positions 1710 and 1720 which correspond to turn-around planning information.

For example, the processor 270 may control the display unit 251 to display a first turn point position 1710 and a second turn point position 1720.

The processor 270 may display the first turn point position 1710 to correspond to information about planning of transition from forward driving to reverse driving.

The processor 270 may display the second turn point position 1720 to correspond to information about planning of transition from reverse driving to forward driving.

The processor 270 may control the display unit 251 based on forward driving situation information, so that a color of at least one region 1730 of the vehicle image 1035 is gradually changed as the vehicle 100 approaches the first turn point position 1710.

The processor 270 may control the display unit 251 based on reverse driving situation information so that a color of at least one region 1730 of the vehicle image 1035 is gradually changed as the vehicle 100 approaches the second turn point position 1720.

Figure 18:
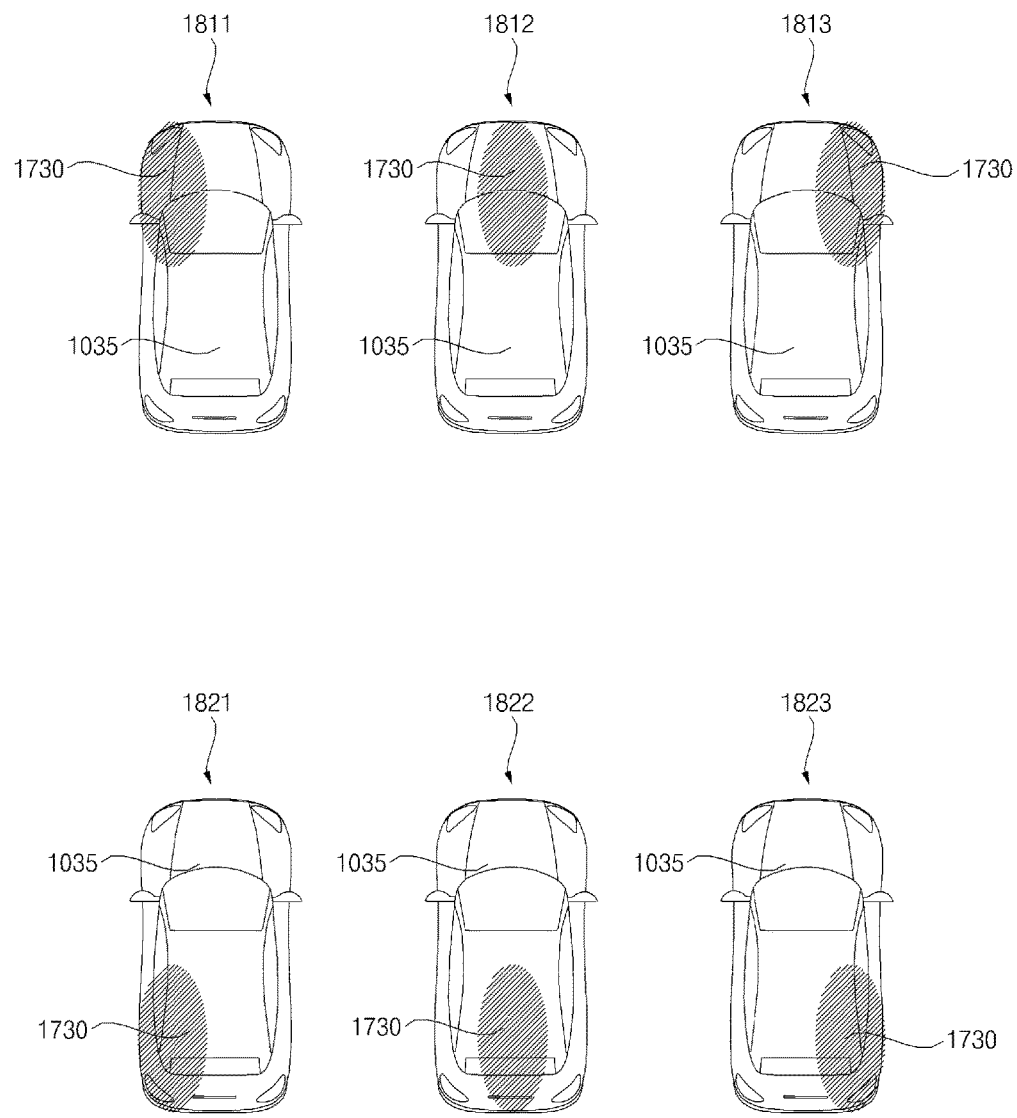

Referring to FIG. 18, the processor 270 may control the display unit 251 based on steering information so that a position of one region 1730 is changed within the vehicle image 1035.

The processor 270 may control the display unit 251 based on forward driving situation information and reverse driving situation information so that a position of one region 1730 is changed within the vehicle image 1035.

The processor 270 may control the display unit 251 based on left-steered driving situation information and right steering driving information so that a position of one region 1730 is changed within the vehicle image 1035.

As shown in the example of 1811, the processor 270 may control the display unit 251 based on a combination of forward driving situation information and left-steered driving situation information, so that one region 1730 subject to color change is changed to the left front end of the vehicle image 1035.

As shown in the example of 1812, when left-steered or right-steered driving situation information has not yet received with driving situation information being received, the processor 270 may control the display unit 251 so that one region 1730 subject to color change is changed to the central front end of the vehicle image 1035.

As shown in the example of 1813, the processor 270 may control the display unit 251 based on a combination of forward driving situation information and left-steered driving situation information, so that one region 1730 subject to color change is changed to a right front end of the vehicle image 1035.

As shown in the example of 1821, the processor 270 may control the display unit 251 based on a combination of reverse driving situation information and left-steered driving situation information, so that one region 1730 subject to color change is changed to the left rear end of the vehicle image 1035.

As shown in the example of 1822, when left-steered or right-steered driving situation information has not been received with reverse driving situation information being received, the processor 270 may control the display unit 251 so that one region 1730 subject to color change is changed to the central rear end of the vehicle image 1035.

As shown in the example of 1823, the processor 270 may control the display unit 251 based on a combination of reverse driving situation information and right-steered driving situation information, so that one region 1730 subject to color change is changed to the right rear end of the vehicle image 1035.

Figure 19:
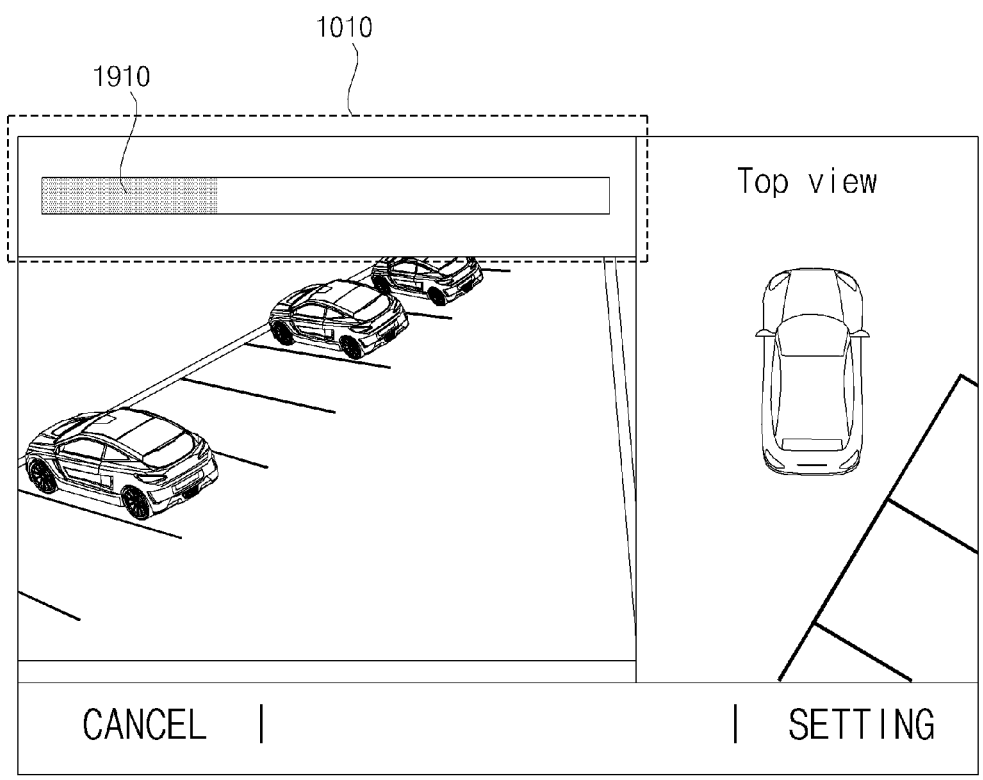

Referring to FIG. 19, the processor 270 may control the display unit 251 to display a progress bar 1910 in a first region 1010.

The progress bar 1910 may be based on autonomous parking path planning information.

The processor 270 may control the display unit 251 to display the progress bar 1910 which indicates the entire autonomous parking path planning.

The processor 270 may control the display unit 251 based on where the vehicle 100 is positioned on the whole autonomous parking path, so that a color of the progress bar 1910 is gradually changed in one direction.

Figure 20:
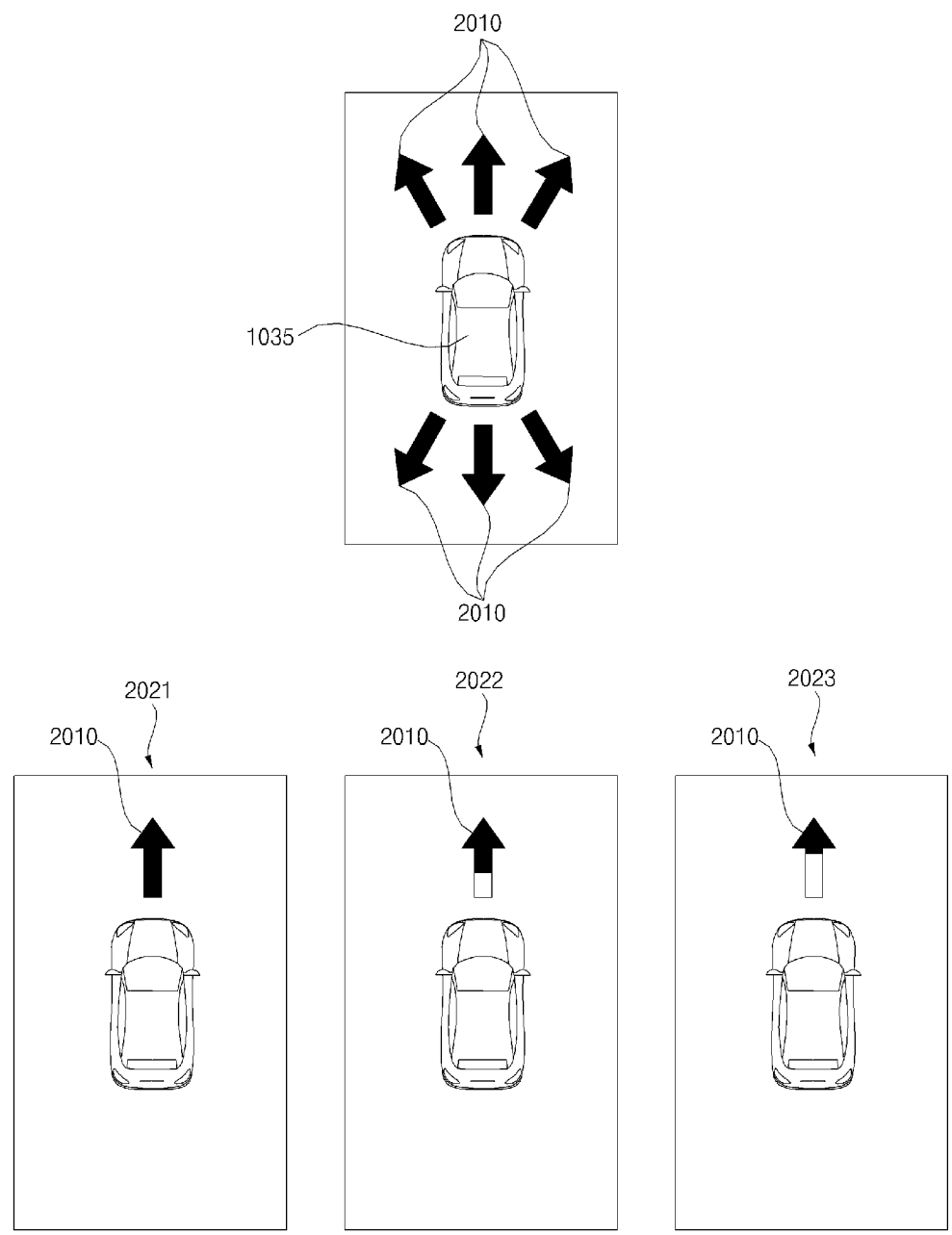

Referring to FIG. 20, the entire autonomous parking path planning information may include one or more items of sub-path planning information.

The processor 270 may display an indicator 2010 in the vicinity of the vehicle image 1035, the indicator 2010 which corresponds to one or more items of sub-path planning information.

The indicator 2010 may correspond one or more items of sub-path planning information, and steering planning information.

The processor 270 may display the indicator 2010 at a position corresponding to the sub-path planning information and the steering planning information.

For example, based on a combination of forward driving planning information and left steering planning information, the processor 270 may display an arrow image in the left front side of the vehicle image 1035.

For example, while steering planning information is not yet received, the processor 270 may display, based on forward driving planning information, an arrow image in the front side of the vehicle image 1035.

For example, based on a combination of forward driving planning information and right steering planning information, the processor 270 may display an arrow image in the right front side of the vehicle image 1035.

For example, based on a combination of reverse driving planning information and left steering planning information, the processor 270 may display an arrow image in the left rear side of the vehicle image 1035.

For example, while steering planning information is not yet received, the processor 270 may display, based on reverse driving planning information, an arrow image in the rear side of the vehicle image 1035.

For example, based on a combination of reverse driving planning information and right steering planning information, the processor 270 may display an arrow image in the right rear side of the vehicle image 2035.

The processor 270 may control the display unit 251 based on driving direction situation information so that a color of the indicator 2010 is gradually changed.

As shown in the examples of 2021, 2022, and 2023, the processor 270 may control the display unit 251 based on forward driving situation information, so that a color of the indicator 2010 is gradually changed in one direction.

Figure 21:
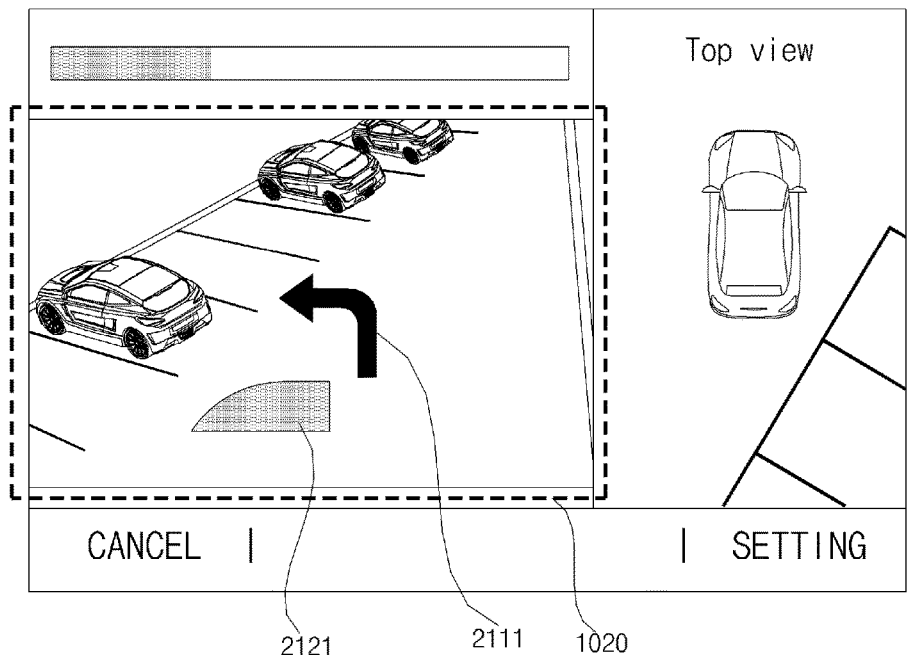
Figure 21:
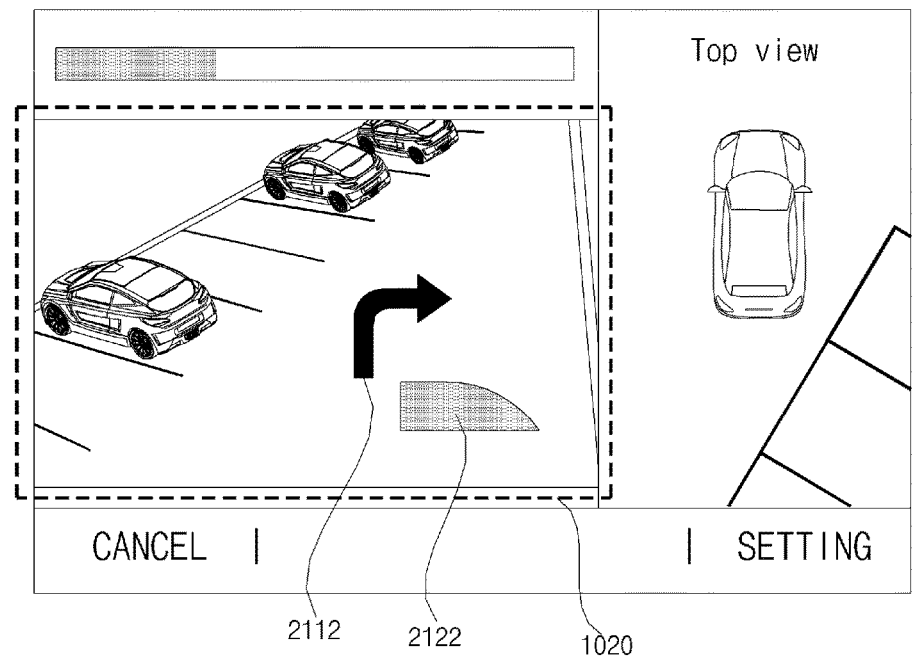

Referring to FIG. 21, the processor 270 may control the display unit 251 so that a graphic object corresponding to steered situation information is displayed in a second region 1020.

The processor 270 may control the display unit 251 so that a graphic object corresponding to steered situation information is displayed while an image acquired by the camera 310 is being displayed.

For example, the processor 270 may control the display unit 251 based on left-steered driving situation information, so that an arrow image 2111 bent to the left is displayed.

For example, the processor 270 may control the display unit based on left-steered driving situation information, so that a left side 2121 of the front bumper is displayed.

For example, the processor 270 may control the display unit based on right-steered driving situation information, so that an arrow image 2112 bent to the right is displayed.

For example, the processor 270 may control the display unit 251 based on right-steered driving situation information, a right side 2122 of the front bumper is displayed.

Figure 22:
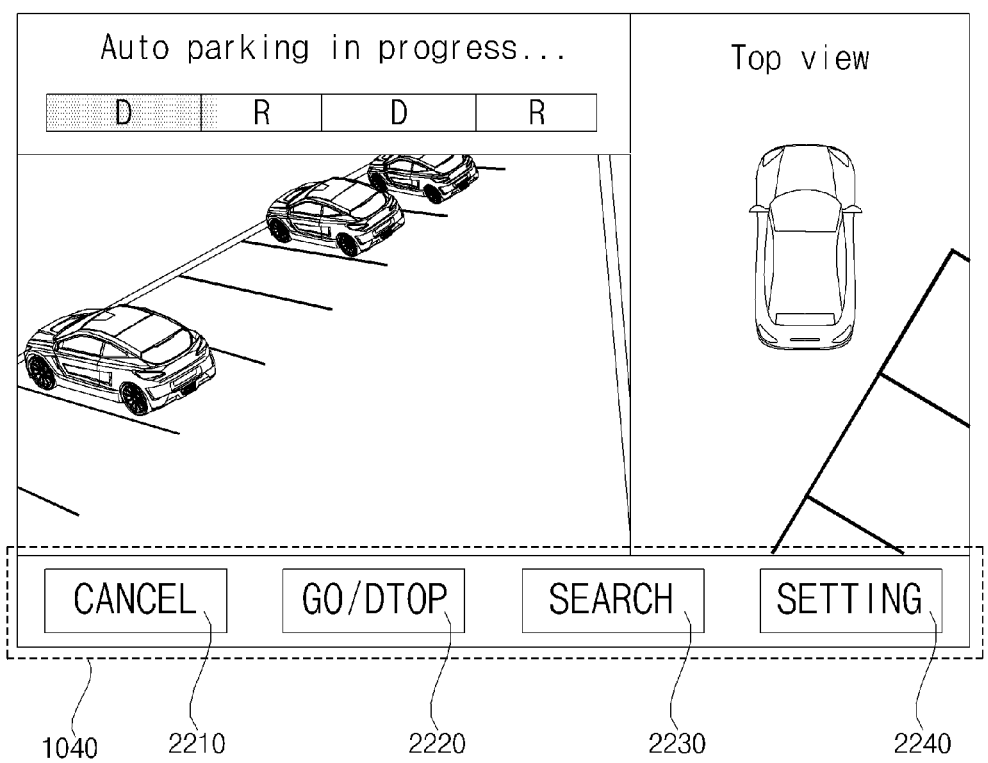
FIGS. 22 and 23 are diagrams illustrating examples of a parking operation based on a user input according to an implementation.
Figure 23:
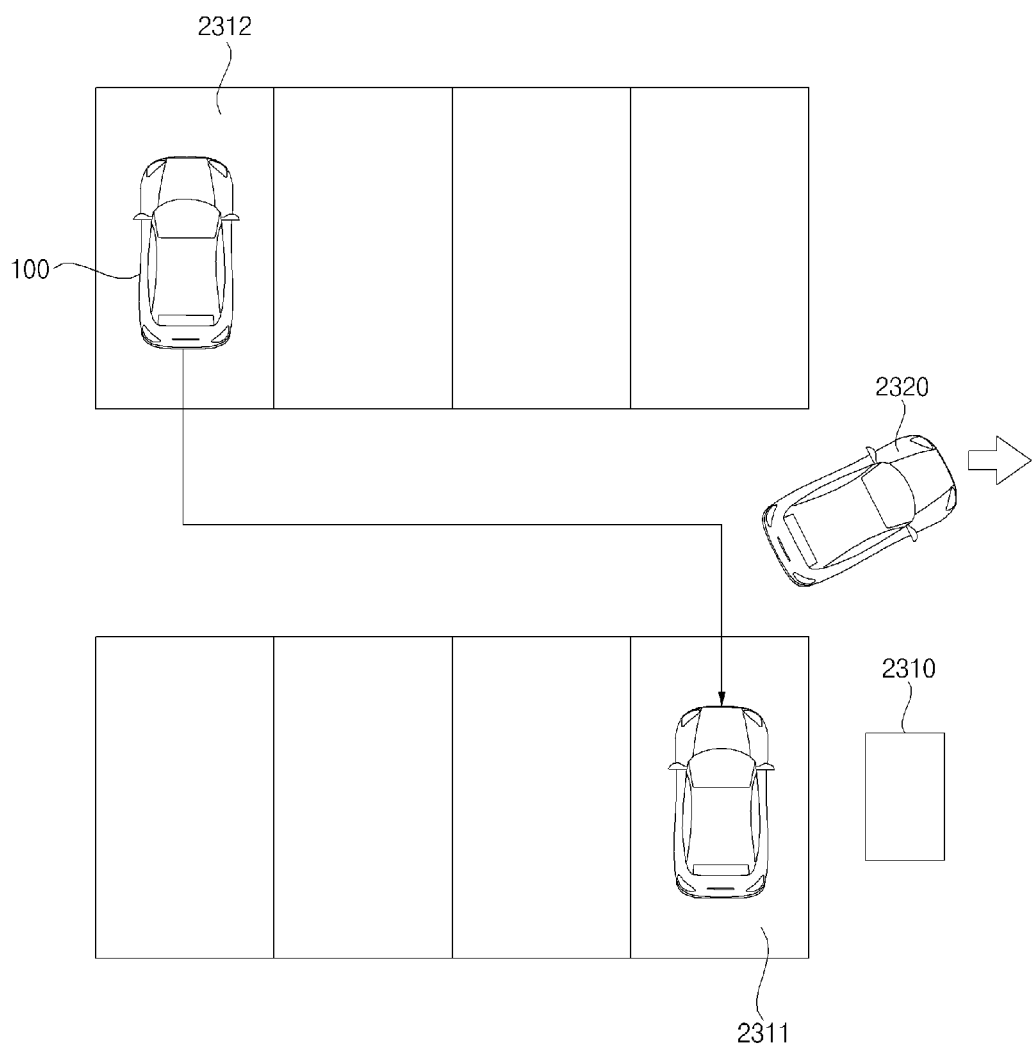

FIGS. 22 and 23 are diagrams illustrating a parking operation based on a user input according to an implementation.

Referring to FIG. 22, the processor 270 may control the display unit 251 so that one or more buttons are displayed in a fourth region 1040.

For example, the processor 270 may control the display unit 251 to display a Cancel button 2210.

When a user's touch input on the Cancel button 2210 is received, the processor 270 may generate a control signal to cancel a parking operation which is based on autonomous parking planning.

The processor 270 may provide a cancellation command to the parking system 750 through the interface unit 245.

The processor 270 may provide a brake control signal, which corresponds to the cancellation command, to the brake drive unit 622 through the interface unit 245.

For example, the processor 270 may control the display unit 251 to display a Go/Stop button 2220.

When a user's touch input on the Go/Stop button 2220 is received with the vehicle 100 in the move, the processor 270 may generate a control signal to stop the movement of the vehicle 100.

The processor 270 may provide a brake control signal to the brake drive unit 622 through the interface unit 245.

When a user's touch on Go/Stop button 2220 is received with the vehicle 100 being stopped, the processor 270 may generate a control signal to make the vehicle 100 to move.

The processor 270 may provide a control signal to the power source drive unit 611 through the interface unit 245 to generate a driving force.

For example, the processor 270 may control the display unit 251 to display a Search button 2230.

When a user's touch input on the Search button 2230, the processor 270 may generate a control signal to search for a new parking space and a path to get there.

The processor 270 may provide a control signal for searching to the parking system 750 through the interface unit 245.

For example, the processor 270 may control the display unit 251 to display a Setting button 2240.

When a user's touch input on the Setting button 2240 is received, the processor 270 may control the display unit 251 to display a setting screen.

The setting screen may include a menu for setting of moving parking.

While the menu for setting of moving parking is displayed, the processor 270 may receive a user's input for setting of moving parking.

Referring to FIG. 23, a nearby vehicle 2320 may be parked before the vehicle 100 into a parking space 2311 in the vicinity of a gate 2310.

The parking system 750 may perform a control operation so that the vehicle 100 is parked before the nearby vehicle 2320 into the empty parking space 2312.

The processor 270 may receive a user input corresponding to moving parking in the vicinity of the gate 2310.

The processor 270 may receive exit information of the nearby vehicle 2320 already parked in the vicinity of the gate 2310.

In this case, the processor 270 may generate a control signal based on the user input to perform a moving parking maneuver.

The processor 270 may transmit a control signal to the vehicle drive apparatus 600 through the interface unit 245.

The present disclosure as described above may be implemented as code that may be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A user interface apparatus for a vehicle, comprising:
a display unit;
an interface unit configured to receive information;
at least one processor; and
a computer-readable medium having stored thereon instructions that, when executed by the at least one processor, causes the at least one processor to perform operations comprising:

receiving, through the interface unit, first information regarding a planned autonomous parking operation of the vehicle;

receiving, through the interface unit, second information regarding a progress of an autonomous parking maneuver being performed by the vehicle based on the planned autonomous parking operation;

displaying, through the display unit, a graphic object that corresponds to the first information regarding the planned autonomous parking operation of the vehicle; and controlling the display unit to apply an animation effect to the graphic object being displayed, wherein the animation effect corresponds to the second information regarding the progress of the autonomous parking maneuver being performed by the vehicle, wherein the first information regarding the planned autonomous parking operation of the vehicle comprises at least one of:

turn-around planning information indicating at least one planned driving operation that changes a driving direction from forward to reverse or from reverse to forward, forward driving planning information indicating at least one planned forward driving operation, reverse driving planning information indicating at least one planned reverse driving operation, left-steering planning information indicating at least one planned left-steering driving operation, or right-steering planning information indicating at least one planned right-steering driving operation, wherein the second information regarding the progress of the autonomous parking maneuver being performed by the vehicle comprises at least one of:

turn-around driving maneuver information indicating at least one driving maneuver in which the vehicle changes a driving direction from forward to reverse or from reverse to forward, forward driving maneuver information indicating at least one forward driving maneuver by the vehicle, reverse driving maneuver information indicating at least one reverse driving maneuver by the vehicle, left-steered driving maneuver information indicating at least one left-steered driving maneuver by the vehicle, or right-steered driving maneuver information indicating at least one right-steered driving maneuver by the vehicle, wherein the operations further comprise:

displaying, through the display unit and based on the turn-around planning information, the graphic object that is divided into a plurality of sections; and controlling the display unit based on the second information to progressively change at least one of a color, a shape, or a transparency of the plurality of sections of the graphic object, wherein displaying, based on the turn-around planning information, the graphic object that is divided into the plurality of sections comprises displaying, based on the turn-around planning information, a progress bar that is divided into a plurality of sections, wherein controlling the display unit based on the second information to change the at least one of the color, the shape, or the transparency of the plurality of sections of the graphic object comprises controlling the display unit based on the second information to change a color of the progress bar along the plurality of sections in a first direction, wherein the operations further comprise:

controlling the display unit so that a first section of the progress bar corresponding to a planned forward driving operation is alternately displayed in the progress bar with a second section of the progress bar corresponding to a planned reverse driving operation, wherein the first information further comprises:

forward distance planning information indicating a forward driving distance of a planned forward driving operation, and reverse distance planning information indicating a reverse driving distance of a planned reverse driving operation, and wherein the second information further comprises:

forward driving distance information indicating a forward driving distance that the vehicle drives based on the forward distance planning information, and reverse driving distance information indicating a reverse driving distance that the vehicle drives based on reverse distance planning information.

2. The user interface apparatus according to claim 1, wherein controlling the display unit to progressively change at least one of a color, a shape, or a transparency of the plurality of sections of the graphic object comprises:

changing the at least one of a color, a shape, or a transparency of the plurality of sections from a first level to an intermediate level that is between the first level and a second level; and changing the at least one of a color, a shape, or a transparency of the plurality of sections from the intermediate level to the second level.

3. The user interface apparatus according to claim 2, wherein controlling the display unit to progressively change at least one of a color, a shape, or a transparency of the plurality of sections of the graphic object comprises:

continuously changing the at least one of a color, a shape, or a transparency of the plurality of sections from the first level to the second level.

4. The user interface apparatus according to claim 1, wherein displaying the graphic object that is divided into the plurality of sections comprises:

distinguishing at least one forward driving section that corresponds to the at least one planned forward driving operation and at least one reverse driving section that corresponds to the least one planned reverse driving operation.

5. The user interface apparatus according to claim 4, wherein the first information further comprises forward distance planning information indicating a forward driving distance of a planned forward driving operation and reverse distance planning information indicating a reverse driving distance of a planned reverse driving operation, and wherein the operations further comprise:

setting at least one of a color, a shape, or a transparency of the at least one forward driving section of the graphic object based on the forward distance planning information; and setting at least one of a color, a shape, or a transparency of the at least one reverse driving section of the graphic object based on the reverse distance planning information.

6. The user interface apparatus according to claim 4,
wherein the second information further comprises forward driving speed information indicating a forward driving speed of a planned forward driving operation and reverse driving speed information indicating a reverse driving speed of a planned reverse driving operation, and
wherein the operations further comprise:
controlling the display unit based on the forward driving speed information to adjust a speed at which the at least one of the color, the shape, or the transparency of the forward driving section of the graphic object is changed; and
controlling the display unit based on the reverse driving speed information to adjust a speed at which at least one of the color, the shape, or the transparency of the reverse driving section of the graphic object is changed.

7. The user interface apparatus according to claim 1, wherein the operations further comprise:
controlling the display unit so that a plurality of first sections including the first section and a plurality of second sections including the second section are alternatively and repeatedly displayed, the plurality of first sections corresponding to the at least one planned forward driving operation and the plurality of second sections corresponding to the at least one planned reverse driving operation.

8. The user interface apparatus according to claim 1, wherein the operations further comprise:
setting a displayed length of the first section of the progress bar based on the forward distance planning information;
setting a displayed length of the second section of the progress bar based on the reverse distance planning information; and
controlling the display unit to change a color of the progress bar at a constant speed.

9. The user interface apparatus according to claim 1, wherein the operations further comprise:
setting a length of the first section of the progress bar and a length of the second section of the progress bar to be uniform;
based on the forward driving distance information, adjusting a speed at which a color of the first section of the progress bar is changed; and
based on the reverse driving distance information, adjusting a speed at which a color of the second section of the progress bar is changed.

10. The user interface apparatus according to claim 1, wherein the operations further comprise:
controlling the display unit to display, in a vicinity of the plurality of sections of the progress bar, one of a left-indicating arrow corresponding to left-steered driving maneuver information or a right-indicating arrow corresponding to right-steered driving maneuver information.

11. A user interface apparatus for a vehicle, comprising:
a display unit;
an interface unit configured to receive information;
at least one processor; and
a computer-readable medium having stored thereon instructions that, when executed by the at least one processor, causes the at least one processor to perform operations comprising:
receiving, through the interface unit, first information regarding a planned autonomous parking operation of the vehicle;
receiving, through the interface unit, second information regarding a progress of an autonomous parking maneuver being performed by the vehicle based on the planned autonomous parking operation;
displaying, through the display unit, a graphic object that corresponds to the first information regarding the planned autonomous parking operation of the vehicle; and
controlling the display unit to apply an animation effect to the graphic object being displayed, wherein the animation effect corresponds to the second information regarding the progress of the autonomous parking maneuver being performed by the vehicle,
wherein the first information regarding the planned autonomous parking operation of the vehicle comprises at least one of:
turn-around planning information indicating at least one planned driving operation that changes a driving direction from forward to reverse or from reverse to forward,
forward driving planning information indicating at least one planned forward driving operation,
reverse driving planning information indicating at least one planned reverse driving operation,
left-steering planning information indicating at least one planned left-steering driving operation, or
right-steering planning information indicating at least one planned right-steering driving operation,
wherein the second information regarding the progress of the autonomous parking maneuver being performed by the vehicle comprises at least one of:
turn-around driving maneuver information indicating at least one driving maneuver in which the vehicle changes a driving direction from forward to reverse or from reverse to forward,
forward driving maneuver information indicating at least one forward driving maneuver by the vehicle,
reverse driving maneuver information indicating at least one reverse driving maneuver by the vehicle,
left-steered driving maneuver information indicating at least one left-steered driving maneuver by the vehicle,
right-steered driving maneuver information indicating at least one right-steered driving maneuver by the vehicle, and
wherein the operations further comprise:
displaying, based on the first information, the graphic object as a circular graphic object corresponding to the first information,
controlling the display unit, based on the second information, to change a color of the displayed circular graphic object,
displaying the circular graphic object as a first donut-shaped graphic object corresponding to the first information,
displaying a second donut-shaped graphic object corresponding to the turn-around planning information,
controlling the display unit, based on the forward driving maneuver information and based on the reverse driving maneuver information, to change a color of the second donut-shaped graphic object in a first direction, and
based on the left-steered driving maneuver information and the right-steered driving maneuver information, determining a direction in which the color of the second donut-shaped graphic object is changed.

12. The user interface apparatus according to claim 11, wherein the operations further comprise:
controlling the display unit to reset the color of the second donut-shaped graphic object at a turn-around maneuver time that corresponds to the vehicle changing the driving direction from forward to reverse or from reverse to forward.

13. A user interface apparatus for a vehicle, comprising:
a display unit;
an interface unit configured to receive information;
at least one processor; and
a computer-readable medium having stored thereon instructions that, when executed by the at least one processor, causes the at least one processor to perform operations comprising:
receiving, through the interface unit, first information regarding a planned autonomous parking operation of the vehicle;
receiving, through the interface unit, second information regarding a progress of an autonomous parking maneuver being performed by the vehicle based on the planned autonomous parking operation;
displaying, through the display unit, a graphic object that corresponds to the first information regarding the planned autonomous parking operation of the vehicle; and
controlling the display unit to apply an animation effect to the graphic object being displayed, wherein the animation effect corresponds to the second information regarding the progress of the autonomous parking maneuver being performed by the vehicle,
wherein the first information regarding the planned autonomous parking operation of the vehicle comprises at least one of:
turn-around planning information indicating at least one planned driving operation that changes a driving direction from forward to reverse or from reverse to forward,
forward driving planning information indicating at least one planned forward driving operation,
reverse driving planning information indicating at least one planned reverse driving operation,
left-steering planning information indicating at least one planned left-steering driving operation, or
right-steering planning information indicating at least one planned right-steering driving operation,
wherein the second information regarding the progress of the autonomous parking maneuver being performed by the vehicle comprises at least one of:
turn-around driving maneuver information indicating at least one driving maneuver in which the vehicle changes a driving direction from forward to reverse or from reverse to forward,
forward driving maneuver information indicating at least one forward driving maneuver by the vehicle,
reverse driving maneuver information indicating at least one reverse driving maneuver by the vehicle,
left-steered driving maneuver information indicating at least one left-steered driving maneuver by the vehicle, or
right-steered driving maneuver information indicating at least one right-steered driving maneuver by the vehicle, and
wherein the operations further comprise:
displaying the graphic object as a vehicle image,
based on at least one of the forward driving maneuver information, the reverse driving maneuver information, the left-steered driving maneuver information, or the right-steered driving maneuver information, controlling the display unit to change a color of the vehicle image from a first color to a second color in a gradual manner in a first direction along the vehicle image,
controlling the display unit, based on the forward driving maneuver information, to change the color of the vehicle image from the first color to the second color in a direction from a front end of the vehicle image to a rear end of the vehicle image, and
controlling the display unit, based on the reverse driving maneuver information, to change the color of the vehicle image from the first color to the second color in a direction from the rear end of the vehicle image to the front end of the vehicle image.

14. The user interface apparatus according to claim 13, wherein the operations further comprise:
controlling the display unit, based on the left-steered driving maneuver information and the right-steered driving maneuver information, to change the color of the vehicle image from the first color to the second color so that a boundary formed between the first color and the second color is inclined at a first angle.

15. The user interface apparatus according to claim 13, wherein the operations further comprise:
controlling the display unit, based on the forward driving maneuver information and the reverse driving maneuver information, to change the color of the vehicle image from the first color to the second color so that a color of at least one region of the vehicle image is gradually changed.

16. The user interface apparatus according to claim 15, wherein the operations further comprise:
controlling the display unit, based on the left-steered driving maneuver information and the right-steered driving maneuver information, to change a position of the at least one region within the vehicle image for which the color is gradually changed.

17. The user interface apparatus according to claim 1, wherein displaying the graphic object that is divided into the plurality of sections comprises:
determining, based on the turn-around planning information, at least one forward driving portion and at least one reverse driving portion of the planned autonomous parking operation of the vehicle; and
displaying the plurality of sections of the graphic object as alternating sections corresponding to the at least one forward driving portion and the at least one reverse driving portion of the planned autonomous parking operation of the vehicle.

* * * * *